US008797555B2

(12) United States Patent
Doi

(10) Patent No.: US 8,797,555 B2
(45) Date of Patent: Aug. 5, 2014

(54) REDISTRIBUTION OF PIXEL VALUES IN AN IMAGE FORMING APPARATUS OR METHOD

(75) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 85 days.

(21) Appl. No.: 13/323,801

(22) Filed: Dec. 12, 2011

(65) Prior Publication Data
US 2012/0147424 A1 Jun. 14, 2012

(30) Foreign Application Priority Data
Dec. 13, 2010 (JP) .................. 2010-276722

(51) Int. Cl.
G06F 3/12 (2006.01)

(52) U.S. Cl.
USPC ........................................ 358/1.1

(58) Field of Classification Search
USPC ........................................ 358/1.1
See application file for complete search history.

(56) References Cited

U.S. PATENT DOCUMENTS 5,587,811 A * 12/1996 Liguori .................... 358/3.2
7,503,634 B2 * 3/2009 Takahashi et al. ........... 347/15
2011/0216331 A1 * 9/2011 Umeda ...................... 358/1.2

FOREIGN PATENT DOCUMENTS

JP 2002-271624 A 9/2002

* cited by examiner

Primary Examiner — Eric A Rust
(74) Attorney, Agent, or Firm — Rabin & Berdo, P.C.

(57) ABSTRACT

To convert N-valued input image data to output image data, where N is an integer equal to or greater than two, a concentration value is determined for each pixel in a set of pixels including a pixel of interest and its neighboring pixels. Ranks are assigned to each of these pixels on the basis of the concentration values. The pixel values of the pixel of interest and its neighboring pixels are then redistributed according to the assigned ranks. This scheme enables pixel clustering to be manipulated in a natural way.

24 Claims, 31 Drawing Sheets

| Rnk11 | Rnk12 | Rnk13 |
| --- | --- | --- |
| Rnk21 | Rnk22 | Rnk23 |
| Rnk31 | Rnk32 | Rnk33 |

| Dt11 | Dt12 | Dt13 |
| --- | --- | --- |
| Dt21 | Dt22 | Dt23 |
| Dt31 | Dt32 | Dt33 |

| IMAGE DATA | BIT PATTERN |
|---|---|
| 0 | 0 0 / 0 0 |
| 1 | 1 0 / 0 0 |
| 2 | 1 1 / 0 0 |
| 3 | 1 1 / 1 0 |
| 4 | 1 1 / 1 1 |

| 0 | 0 | 1 | 0 | 1 | 1 | 1 | 1 | 1 | 1 |
|---|---|---|---|---|---|---|---|---|---|
| 0 | 0 | 0 | 0 | 0 | 0 | 1 | 0 | 1 | 1 |

| 0 | 0 | 1 | 0 | 1 | 1 | 1 | 1 | 1 | 1 |
|---|---|---|---|---|---|---|---|---|---|
| 0 | 0 | 0 | 0 | 0 | 0 | 1 | 0 | 1 | 1 |

FIG.12A

|  | x= 0 | 1 | 2 | 3 | 4 | 5 | 6 | 7 |
|---|---|---|---|---|---|---|---|---|
| y= 0 | 0 | 0 | 0 | 0 | 0 | 0 | 0 | 0 |
| 1 | 0 | 1 | 1 | 1 | 1 | 0 | 2 | 0 |
| 2 | 0 | 0 | 2 | 0 | 1 | 1 | 0 | 0 |
| 3 | 0 | 0 | 0 | 1 | 0 | 1 | 0 | 0 |
| 4 | 0 | 0 | 0 | 0 | 0 | 0 | 0 | 0 |

FIG.12B

|  | x= 0 | 1 | 2 | 3 | 4 | 5 | 6 | 7 |
|---|---|---|---|---|---|---|---|---|
| y= 0 | 0 | 0 | 0 | 0 | 0 | 0 | 0 | 0 |
| 1 | 0 | 0 | 1 | 1 | 1 | 0 | 2 | 0 |
| 2 | 0 | 0 | 3 | 0 | 1 | 1 | 0 | 0 |
| 3 | 0 | 0 | 0 | 1 | 0 | 1 | 0 | 0 |
| 4 | 0 | 0 | 0 | 0 | 0 | 0 | 0 | 0 |

FIG.13A

FILTER SETTING 1

| 0 | 0 | 0 |
|---|---|---|
| 0 | 32 | 0 |
| 0 | 0 | 0 |

FIG.13B

FILTER SETTING 2

| 4 | 8 | 4 |
|---|---|---|
| 8 | 32 | 8 |
| 4 | 8 | 4 |

FIG.14A
|   | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 2 | 0 |
| 2 | 0 | 0 | 4 | 0 | 4 | 0 | 0 | 0 |
| 3 | 0 | 0 | 0 | 1 | 0 | 1 | 0 | 0 |
| 4 | 0 | 0 | 0 | 0 | 0 | 0 | 0 | 0 |
FIG.14B
|   | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 0 | 0 | 4 | 0 | 4 | 4 | 0 | 0 |
| 3 | 0 | 0 | 0 | 0 | 0 | 0 | 0 | 0 |
| 4 | 0 | 0 | 0 | 0 | 0 | 0 | 0 | 0 |
FIG.14C
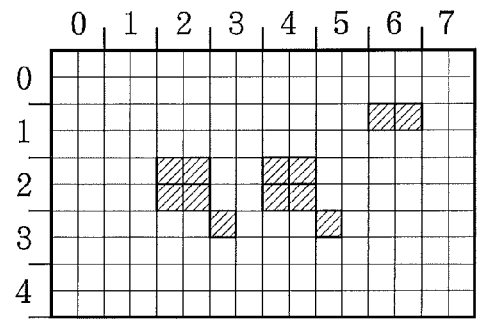
FIG.14D
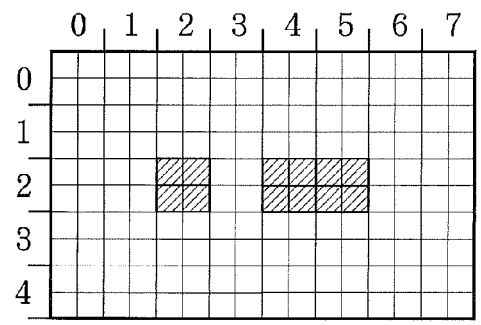
FIG.14E
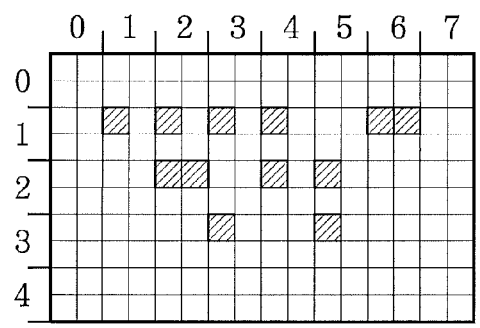

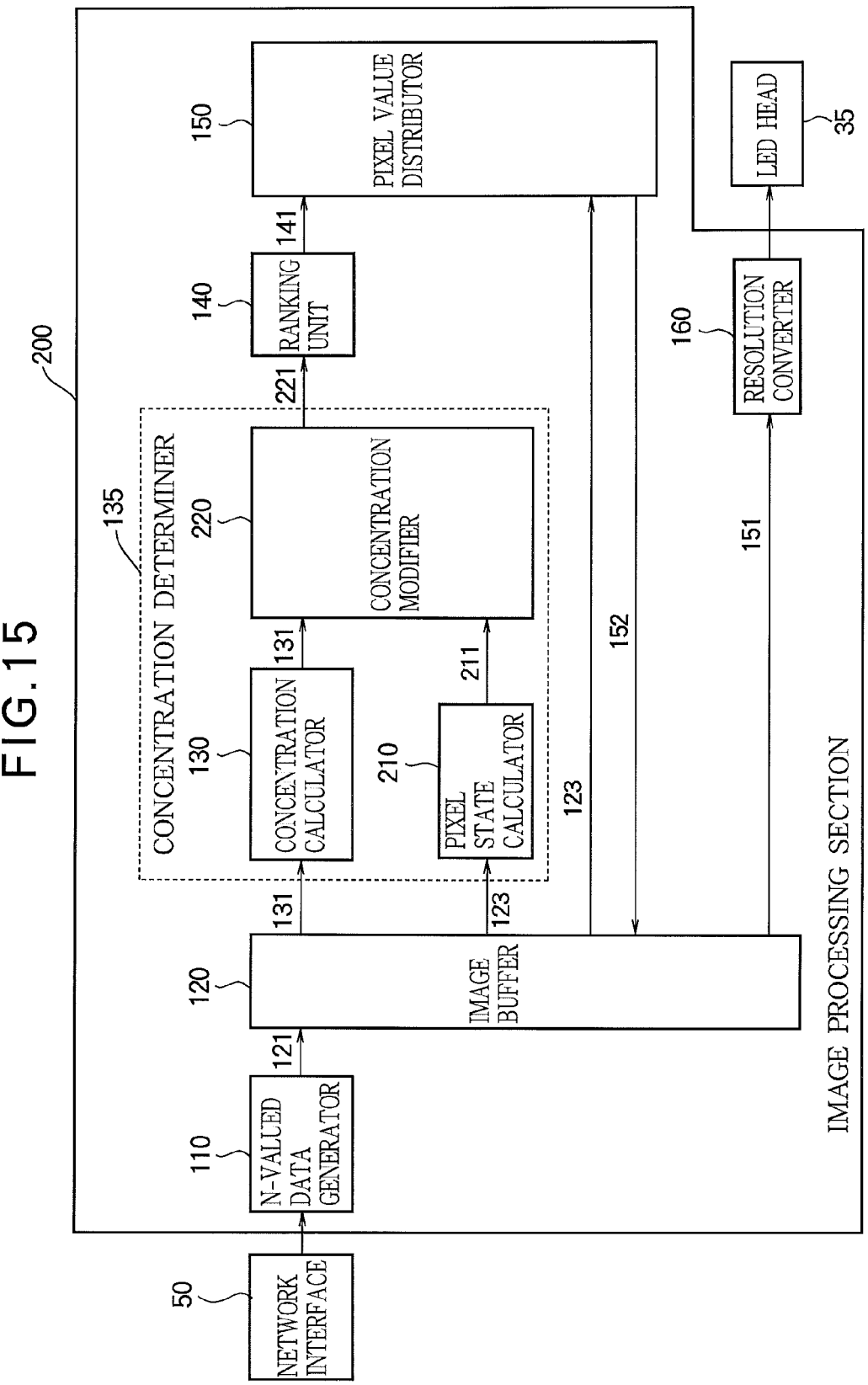

FIG.16A
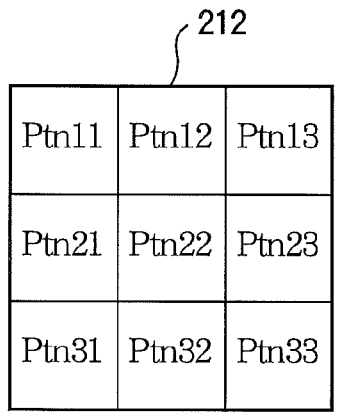
| Ptn11 | Ptn12 | Ptn13 |
| --- | --- | --- |
| Ptn21 | Ptn22 | Ptn23 |
| Ptn31 | Ptn32 | Ptn33 |
212
FIG.16B
Ptn**
| Reverse | Lower | Pix |
| --- | --- | --- |
FIG.17
| IMAGE DATA | DECISION RESULT |
| --- | --- |
| 112 TO 143 | 1 |
| OTHERWISE | 0 |
FIG.18A
OFFSET GROUP_0
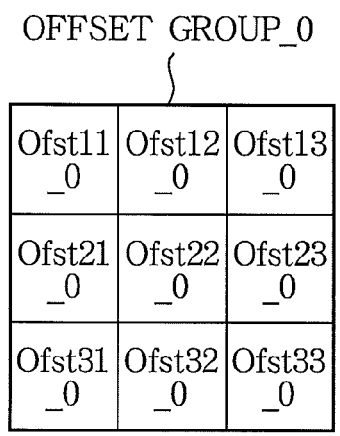
| Ofst11_0 | Ofst12_0 | Ofst13_0 |
| --- | --- | --- |
| Ofst21_0 | Ofst22_0 | Ofst23_0 |
| Ofst31_0 | Ofst32_0 | Ofst33_0 |
FIG.18B
OFFSET GROUP_1
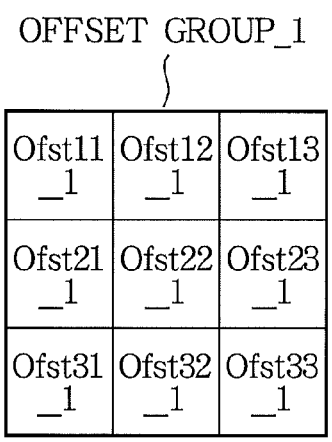
| Ofst11_1 | Ofst12_1 | Ofst13_1 |
| --- | --- | --- |
| Ofst21_1 | Ofst22_1 | Ofst23_1 |
| Ofst31_1 | Ofst32_1 | Ofst33_1 |

FIG.19A

OFFSET GROUP_0

| Ofst11_0=0 | Ofst12_0=0 | Ofst13_0=0 |
|---|---|---|
| Ofst21_0=0 | Ofst22_0=0 | Ofst23_0=0 |
| Ofst31_0=0 | Ofst32_0=0 | Ofst33_0=0 |

FIG.19B

OFFSET GROUP_1

| Ofst11_1=0 | Ofst12_1=128 | Ofst13_1=0 |
|---|---|---|
| Ofst21_1=128 | Ofst22_1=0 | Ofst23_1=64 |
| Ofst31_1=0 | Ofst32_1=64 | Ofst33_1=0 |

FIG.20A

| x= | 0 | 1 | 2 | 3 | 4 | 5 | 6 | 7 |
|---|---|---|---|---|---|---|---|---|
| y=0 | 4 | 0 | 4 | 0 | 4 | 0 | 4 | 0 |
| 1 | 0 | 4 | 0 | 4 | 0 | 4 | 0 | 4 |
| 2 | 4 | 0 | 4 | 0 | 4 | 0 | 4 | 0 |
| 3 | 0 | 4 | 0 | 4 | 0 | 4 | 0 | 4 |
| 4 | 4 | 0 | 4 | 0 | 4 | 0 | 4 | 0 |

FIG.20B

| x= | 0 | 1 | 2 | 3 | 4 | 5 | 6 | 7 |
|---|---|---|---|---|---|---|---|---|
| y=0 | 4 | 0 | 4 | 0 | 4 | 0 | 4 | 0 |
| 1 | 4 | 0 | 0 | 4 | 0 | 4 | 0 | 4 |
| 2 | 4 | 0 | 4 | 0 | 4 | 0 | 4 | 0 |
| 3 | 0 | 4 | 0 | 4 | 0 | 4 | 0 | 4 |
| 4 | 4 | 0 | 4 | 0 | 4 | 0 | 4 | 0 |

FIG.21

| Ptn11={0, 0, 4} | Ptn12={0, 0, 0} | Ptn13={0, 0, 4} |
| --- | --- | --- |
| Ptn21={0, 0, 0} | Ptn22={1, 1, 0} | Ptn23={1, 1, 0} |
| Ptn31={1, 1, 0} | Ptn32={1, 1, 0} | Ptn33={1, 1, 0} |

FIG.22A

|   | 0 | 1 | 2 | 3 | 4 | 5 | 6 | 7 |
| --- | --- | --- | --- | --- | --- | --- | --- | --- |
| 0 | 4 | 0 | 4 | 0 | 4 | 0 | 4 | 0 |
| 1 | 4 | 0 | 4 | 0 | 4 | 0 | 0 | 4 |
| 2 | 4 | 4 | 4 | 4 | 4 | 0 | 4 | 0 |
| 3 | 0 | 0 | 0 | 0 | 4 | 0 | 0 | 4 |
| 4 | 4 | 0 | 4 | 0 | 4 | 0 | 4 | 0 |

| PIXEL DATA | SUB-PIXEL POSITION INFORMATION | | | BIT PATTERN |
|---|---|---|---|---|
| | STARTING POINT INFORMATION | GROWING DIRECTION INFORMATION | DIAGONAL GROWING FLAG | |
| 0 | — | | | 0 0 / 0 0 |
| 1 | 0 | — | | 1 0 / 0 0 |
| | 1 | | | 0 1 / 0 0 |
| | 2 | | | 0 0 / 1 0 |
| | 3 | | | 0 0 / 0 1 |
| 2 | 0 | 0 | — | 1 1 / 0 0 |
| | | 1 | | 1 0 / 1 0 |
| | 1 | 0 | — | 0 1 / 0 1 |
| | | 1 | | 1 1 / 0 0 |
| | 2 | 0 | — | 1 0 / 1 0 |
| | | 1 | | 0 0 / 1 1 |
| | 3 | 0 | — | 0 0 / 1 1 |
| | | 1 | | 0 1 / 0 1 |
| 3 | 0 | — | | 1 1 / 1 0 |
| | 1 | | | 1 1 / 0 1 |
| | 2 | | | 1 0 / 1 1 |
| | 3 | | | 0 1 / 1 1 |
| 4 | — | | | 1 1 / 1 1 |

FIG.26A

| x= | 0 | 1 | 2 | 3 | 4 | 5 | 6 | 7 |
|---|---|---|---|---|---|---|---|---|
| y=0 | 0 | 0 | 0 | 0 | 0 | 0 | 0 | 0 |
| 1 | 3 | 2 | 3 | 2 | 2 | 1 | 4 | 2 |
| 2 | 2 | 4 | 2 | 2 | 4 | 3 | 4 | 2 |
| 3 | 3 | 3 | 1 | 0 | 0 | 0 | 0 | 4 |
| 4 | 3 | 0 | 0 | 0 | 0 | 0 | 0 | 0 |

FIG.26B

| x= | 0 | 1 | 2 | 3 | 4 | 5 | 6 | 7 |
|---|---|---|---|---|---|---|---|---|
| y=0 | 0 | 0 | 0 | 0 | 0 | 0 | 0 | 0 |
| 1 | 3 | 2 | 3 | 3 | 2 | 1 | 4 | 2 |
| 2 | 2 | 4 | 2 | 2 | 4 | 3 | 4 | 2 |
| 3 | 3 | 3 | 1 | 0 | 0 | 0 | 0 | 4 |
| 4 | 3 | 0 | 0 | 0 | 0 | 0 | 0 | 0 |

FIG.26C

| x= | 0 | 1 | 2 | 3 | 4 | 5 | 6 | 7 |
|---|---|---|---|---|---|---|---|---|
| y=0 | 0 | 0 | 0 | 0 | 0 | 0 | 0 | 0 |
| 1 | 0 | 4 | 4 | 4 | 4 | 4 | 0 | 0 |
| 2 | 0 | 4 | 4 | 1 | 4 | 4 | 4 | 4 |
| 3 | 1 | 4 | 0 | 0 | 0 | 0 | 0 | 4 |
| 4 | 3 | 0 | 0 | 0 | 0 | 0 | 0 | 0 |

FIG.26D

| x= | 0 | 1 | 2 | 3 | 4 | 5 | 6 | 7 |
|---|---|---|---|---|---|---|---|---|
| y=0 | {0,0,3} | {0,0,3} | {0,0,3} | {0,0,3} | {0,1,2} | {0,1,2} | {0,1,2} | {0,1,2} |
| 1 | {0,1,3} | {0,0,3} | {0,0,3} | {0,1,3} | {0,1,3} | {0,0,2} | {0,0,2} | {0,0,2} |
| 2 | {0,0,1} | {0,1,1} | {0,1,1} | {0,0,1} | {0,1,1} | {0,0,0} | {0,1,0} | {0,1,0} |
| 3 | {0,0,1} | {0,1,1} | {0,0,0} | {0,0,0} | {0,1,1} | {0,1,0} | {0,0,0} | {0,0,0} |
| 4 | {0,1,1} | {0,0,0} | {0,0,0} | {0,0,0} | {0,1,1} | {0,1,1} | {0,1,1} | {0,0,0} |

FIG.31

| Y-DIRECTION PIXEL POSITION | X-DIRECTION PIXEL POSITION | SCREEN OFFSET | | | | | | | | |
|---|---|---|---|---|---|---|---|---|---|---|
| | | Ofset11 | Ofset12 | Ofset13 | Ofset21 | Ofset22 | Ofset23 | Ofset31 | Ofset32 | Ofset33 |
| 0 | 0 | 28 | 20 | 28 | 20 | 0 | 20 | 28 | 20 | 28 |
| | 1 | 20 | 28 | 45 | 0 | 20 | 40 | 20 | 28 | 45 |
| | 2 | 8 | 25 | 20 | 0 | 20 | 40 | 8 | 25 | 20 |
| | 3 | 5 | 0 | 5 | 0 | 20 | 0 | 5 | 0 | 5 |
| | 4 | 20 | 25 | 8 | 40 | 20 | 0 | 20 | 25 | 8 |
| | 5 | 45 | 28 | 20 | 40 | 20 | 0 | 45 | 28 | 20 |
| 1 | 0 | 20 | 0 | 20 | 28 | 20 | 28 | 45 | 40 | 45 |
| | 1 | 0 | 20 | 40 | 20 | 28 | 45 | 40 | 45 | 28 |
| | 2 | 0 | 20 | 40 | 8 | 25 | 20 | 25 | 8 | 0 |
| | 3 | 20 | 40 | 20 | 25 | 20 | 25 | 8 | 0 | 8 |
| | 4 | 40 | 20 | 0 | 20 | 25 | 8 | 0 | 8 | 25 |
| | 5 | 40 | 20 | 0 | 45 | 28 | 20 | 28 | 45 | 40 |
| 2 | 0 | 8 | 0 | 8 | 25 | 20 | 25 | 20 | 40 | 20 |
| | 1 | 0 | 8 | 25 | 20 | 25 | 8 | 40 | 20 | 0 |
| | 2 | 28 | 45 | 40 | 45 | 28 | 20 | 40 | 20 | 0 |
| | 3 | 45 | 40 | 45 | 28 | 20 | 28 | 20 | 0 | 20 |
| | 4 | 40 | 45 | 28 | 20 | 28 | 45 | 0 | 20 | 40 |
| | 5 | 25 | 8 | 0 | 8 | 25 | 20 | 0 | 20 | 40 |
| 3 | 0 | 5 | 0 | 5 | 0 | 20 | 0 | 5 | 0 | 5 |
| | 1 | 20 | 25 | 8 | 40 | 20 | 0 | 20 | 25 | 8 |
| | 2 | 45 | 28 | 20 | 40 | 20 | 0 | 45 | 28 | 20 |
| | 3 | 28 | 20 | 28 | 20 | 0 | 20 | 28 | 20 | 28 |
| | 4 | 20 | 28 | 45 | 0 | 20 | 40 | 20 | 28 | 45 |
| | 5 | 8 | 25 | 20 | 0 | 20 | 40 | 8 | 25 | 20 |
| 4 | 0 | 20 | 40 | 20 | 25 | 20 | 25 | 8 | 0 | 8 |
| | 1 | 40 | 20 | 0 | 20 | 25 | 8 | 0 | 8 | 25 |
| | 2 | 40 | 20 | 0 | 45 | 28 | 20 | 28 | 45 | 40 |
| | 3 | 20 | 0 | 20 | 28 | 20 | 28 | 45 | 40 | 45 |
| | 4 | 0 | 20 | 40 | 20 | 28 | 45 | 40 | 45 | 28 |
| | 5 | 0 | 20 | 40 | 8 | 25 | 20 | 25 | 8 | 0 |
| 5 | 0 | 45 | 40 | 45 | 28 | 20 | 28 | 20 | 0 | 20 |
| | 1 | 40 | 45 | 28 | 20 | 28 | 45 | 0 | 20 | 40 |
| | 2 | 25 | 8 | 0 | 8 | 25 | 20 | 0 | 20 | 40 |
| | 3 | 8 | 0 | 8 | 25 | 20 | 25 | 20 | 40 | 20 |
| | 4 | 0 | 8 | 25 | 20 | 25 | 8 | 40 | 20 | 0 |
| | 5 | 28 | 45 | 40 | 45 | 28 | 20 | 40 | 20 | 0 |

| | x=0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| y=0 | 0 | 0 | 0 | 0 | 0 | 0 | 0 | 0 | 0 | 0 | 0 | 0 | 0 | 0 | 0 | 3 | 2 | 4 | 3 | 2 | 3 | 2 | 3 | 3 | 4 | 2 | 3 | 2 |
| 1 | 0 | 0 | 2 | 1 | 2 | 0 | 3 | 0 | 3 | 0 | 0 | 0 | 0 | 0 | 0 | 1 | 2 | 1 | 2 | 3 | 2 | 3 | 1 | 2 | 2 | 2 | 3 | 3 |
| 2 | 0 | 0 | 2 | 4 | 4 | 4 | 4 | 4 | 4 | 4 | 4 | 2 | 0 | 0 | 0 | 3 | 2 | 4 | 1 | 2 | 2 | 2 | 3 | 2 | 2 | 2 | 2 | 3 |
| 3 | 0 | 0 | 3 | 4 | 3 | 0 | 2 | 0 | 2 | 3 | 4 | 4 | 0 | 0 | 0 | 2 | 1 | 3 | 2 | 2 | 3 | 1 | 3 | 2 | 3 | 3 | 1 | 3 |
| 4 | 0 | 0 | 1 | 4 | 3 | 0 | 0 | 0 | 0 | 0 | 3 | 4 | 3 | 0 | 0 | 1 | 2 | 2 | 3 | 2 | 3 | 3 | 1 | 3 | 1 | 2 | 2 | 3 |
| 5 | 0 | 0 | 3 | 4 | 3 | 0 | 0 | 0 | 0 | 0 | 3 | 4 | 1 | 0 | 0 | 3 | 2 | 2 | 3 | 1 | 2 | 2 | 3 | 3 | 3 | 2 | 3 | 2 |
| 6 | 0 | 0 | 2 | 4 | 3 | 0 | 0 | 0 | 0 | 0 | 3 | 4 | 1 | 0 | 0 | 1 | 2 | 3 | 2 | 2 | 2 | 2 | 2 | 1 | 3 | 1 | 1 | 3 |
| 7 | 0 | 0 | 3 | 3 | 4 | 0 | 0 | 0 | 0 | 2 | 4 | 3 | 0 | 0 | 0 | 2 | 2 | 2 | 3 | 2 | 3 | 3 | 2 | 3 | 2 | 2 | 4 | 2 |
| 8 | 0 | 0 | 3 | 3 | 4 | 4 | 4 | 4 | 4 | 4 | 2 | 0 | 0 | 0 | 0 | 1 | 2 | 3 | 2 | 2 | 3 | 0 | 3 | 1 | 4 | 0 | 3 | 2 |
| 9 | 0 | 0 | 2 | 4 | 4 | 2 | 2 | 4 | 3 | 4 | 4 | 2 | 0 | 0 | 0 | 3 | 1 | 3 | 1 | 3 | 1 | 4 | 1 | 4 | 1 | 3 | 2 | 3 |
| 10 | 0 | 0 | 2 | 4 | 2 | 0 | 0 | 0 | 0 | 2 | 4 | 4 | 0 | 0 | 0 | 0 | 3 | 3 | 2 | 2 | 2 | 2 | 3 | 2 | 1 | 2 | 3 | 1 |
| 11 | 0 | 0 | 3 | 4 | 3 | 0 | 0 | 0 | 0 | 0 | 3 | 4 | 1 | 0 | 0 | 2 | 2 | 2 | 2 | 3 | 2 | 2 | 2 | 3 | 2 | 3 | 3 | 2 |
| 12 | 0 | 0 | 3 | 3 | 4 | 0 | 0 | 0 | 0 | 0 | 3 | 4 | 2 | 0 | 0 | 2 | 3 | 1 | 2 | 3 | 2 | 3 | 1 | 3 | 2 | 1 | 3 | 2 |
| 13 | 0 | 0 | 1 | 4 | 2 | 0 | 0 | 0 | 0 | 0 | 3 | 4 | 2 | 0 | 0 | 1 | 3 | 2 | 2 | 3 | 1 | 3 | 2 | 2 | 2 | 2 | 3 | 2 |
| 14 | 0 | 0 | 3 | 2 | 4 | 0 | 0 | 0 | 0 | 0 | 1 | 4 | 1 | 0 | 0 | 2 | 2 | 2 | 2 | 2 | 2 | 2 | 2 | 3 | 2 | 3 | 1 | 4 |
| 15 | 0 | 0 | 0 | 0 | 0 | 0 | 0 | 0 | 0 | 0 | 0 | 0 | 0 | 0 | 0 | 1 | 3 | 2 | 3 | 2 | 3 | 2 | 2 | 3 | 1 | 3 | 3 | 2 |

REDISTRIBUTION OF PIXEL VALUES IN AN IMAGE FORMING APPARATUS OR METHOD

BACKGROUND OF THE INVENTION

1. Field of the Invention

The present invention relates to an image forming apparatus such as a printer or monitor and to an image forming method, more particularly to the redistribution of pixel value in the image forming apparatus or method.

2. Description of the Related Art

In image forming apparatuses it is frequently necessary to convert input image data to a resolution and tone scale capable of output by the image forming apparatus. Conventional methods employed for this purpose include dithering, density patterns, and error diffusion, but there are problems associated with these methods.

Dithering, which is used in general printing, and density patterns, which can be used to obtain halftone screen effects, are areal methods that obtain tone rendition by sacrificing spatial resolution. Dithering also tends to produce unwanted moire patterns when the input image is a halftone image.

Error diffusion can reproduce sharper edges than dithering and density patterns and is good at rendering text, but in rendering intermediate tones and gradations, it tends to generate dot patterns that the image forming apparatus cannot faithfully reproduce. Consequent problems include vanishing of low-tone image areas and collapse of gradations in medium- or high-tone image areas. These problems also occur with dithering, and with dispersed density patterns.

When the image forming apparatus is a high resolution electrophotographic printer, there are particular difficulties in reproducing isolated dots or small groups of dots, which occur frequently in all of the above methods. Further discussion can be found in Japanese Patent Application Publication No. 2002-271624.

SUMMARY OF THE INVENTION

An object of the present invention is to improve the quality of an image formed by an image forming apparatus confronted with image data including dot patterns or tone patterns that the image forming apparatus cannot reproduce faithfully.

The present invention provides an image forming method that converts N-valued input image data to output data, where N is an integer equal to or greater than two. The method includes determining a concentration for each pixel in a set of pixels including a pixel of interest and a plurality of neighboring pixels disposed near the pixel of interest. Ranks are assigned to the pixel of interest and to each of the neighboring pixels according to the concentrations thus determined. The pixel values of the pixel of interest and the neighboring pixels are then redistributed according to the assigned ranks.

The invention also provides an image forming apparatus that operates by the above method. The image forming apparatus has a concentration determiner for determining the concentrations, a ranking unit for assigning the ranks, and a pixel value distributor for redistributing pixel values according to the ranks.

Redistribution of pixel values according to ranks determined on the basis of concentration values enables the clustering of pixel value to be manipulated in a natural way to generate output data that the image forming apparatus can successfully reproduce. This enables image tones to be rendered more faithfully and fine features to be reproduced more clearly.

BRIEF DESCRIPTION OF THE DRAWINGS

In the attached drawings:

FIG. 12A shows exemplary image data stored in the image buffer before pixel distribution processing;

FIG. 12B shows the exemplary image data stored in the image buffer after one pixel value has been redistributed;

FIGS. 13A and 13B show exemplary weighting filter coefficients;

FIGS. 14A to 14D illustrate image data and dot patterns resulting from processing according to the first embodiment;

FIG. 14E illustrates a conventional dot pattern;

FIG. 15 is a block diagram of the image processing section, network interface, and LED head in a second embodiment of the invention;

FIGS. 16A and 16B illustrate an exemplary decision method that may be used by the pixel state calculator in FIG. 15;

FIG. 17 illustrates another exemplary decision method that may be used by the pixel state calculator in FIG. 15;

FIGS. 18A and 18B illustrate notation for two exemplary groups of offsets used by the concentration modifier in FIG. 15;

FIGS. 19A and 19B show exemplary values of the offsets in FIGS. 18A and 18B;

FIG. 20A shows exemplary image data stored in the image buffer before pixel distribution processing;

FIG. 20B shows the exemplary image data stored in the image buffer after one pixel value has been redistributed;

FIG. 21 shows exemplary parameters of the decision method illustrated in FIGS. 16A and 16B;

FIGS. 22A and 22B show the image data and dot pattern obtained by processing the exemplary data in FIG. 20A according to the parameters in FIG. 21;

FIG. 22C shows a dot pattern obtained by processing the exemplary data in FIG. 20A according to the first embodiment;

FIG. 25 illustrates the bit pattern conversion rule used by the resolution converter in FIG. 23;

FIG. 26A shows exemplary image data output from the N-valued data generator in FIG. 23;

FIG. 26B shows the image data in FIG. 26A after one pixel value has been redistributed;

FIG. 26C shows the image data in FIG. 26A at the end of the distribution processing;

FIG. 26D shows the sub-pixel position information generated for the image data in FIG. 26A;

FIG. 31 shows exemplary offsets stored in the screen offset storage unit in FIG. 29;

FIG. 33 shows exemplary N-valued image data before processing according to the fourth embodiment;

FIG. 39 shows exemplary source image data processed in the fifth embodiment;

FIG. 40 shows the source image data in FIG. 39 after conversion to N-valued data;

FIG. 41 shows characteristic information for the source image data in FIG. 39.

DETAILED DESCRIPTION OF THE INVENTION

Figure 1:
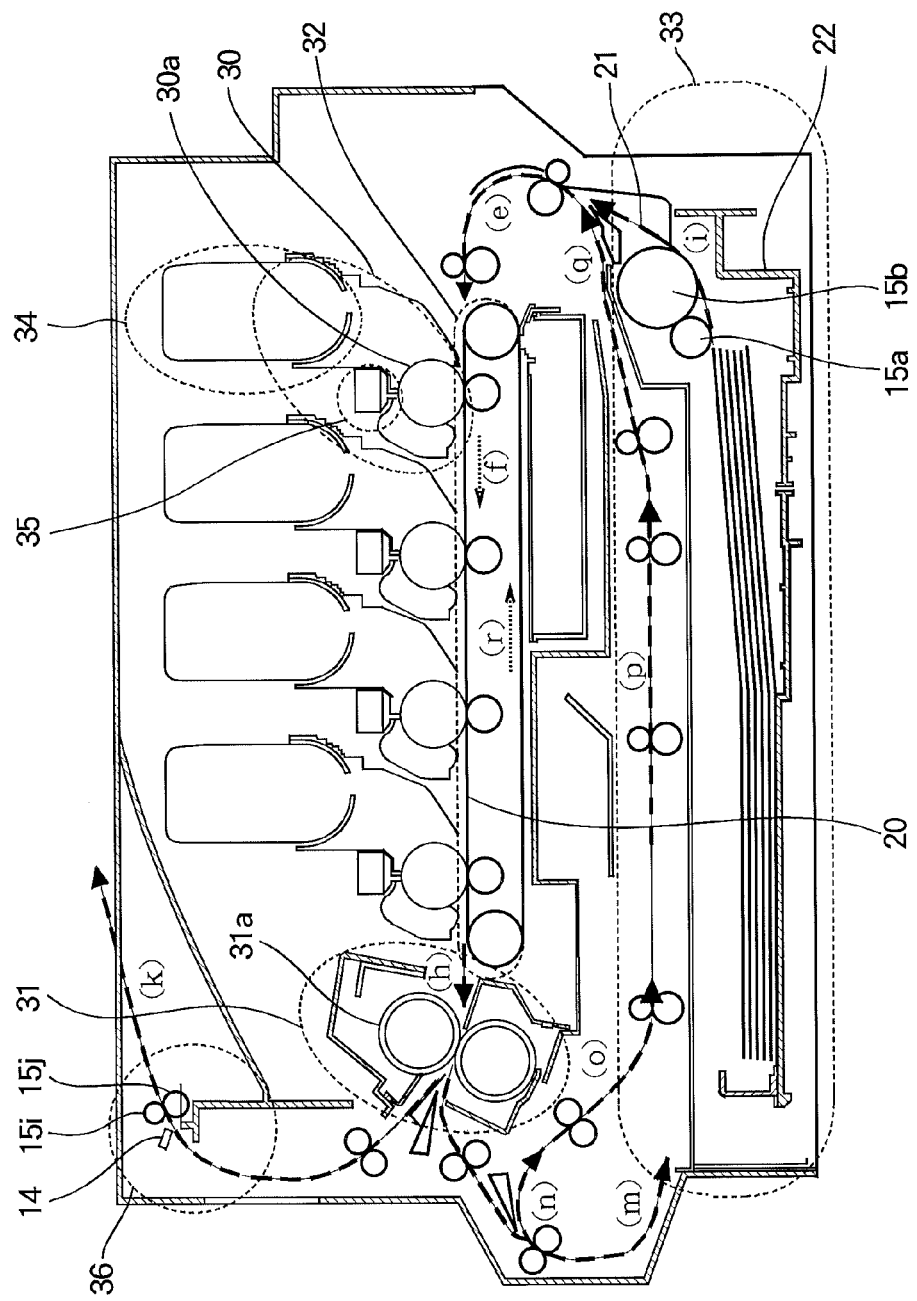
FIG. 1 is a schematic side sectional view of an image forming apparatus.

Embodiments of the invention will now be described with reference to the attached drawings, in which like elements are indicated by like reference characters.

The embodiments are applicable to, for example, the image forming apparatus shown in FIG. 1: a tandem color electrophotographic printer including a fusing section 31, a transfer section 32, a paper supply section 33, a delivery section 36, and for each of four colors, a photosensitive section 30, a toner cartridge 34, and an LED head 35.

The paper supply section 33 has a pair of rollers 15a, 15b that supply recording media 21 from a paper cassette 22 in response to commands from a control unit (not shown).

Each toner cartridge 34 is filled with toner, which is supplied by the rotation of a developer roller (not shown) to the photosensitive section 30.

The photosensitive section 30 includes a photosensitive drum 30a, as well as the above-mentioned developer roller and a charging roller (not shown). The photosensitive drum 30a is electrically charged, then illuminated by the LED head 35 responsive to image data processed by the image processing section 100 to form a latent electrostatic image. The latent electrostatic image is developed by application of toner from the toner cartridge 34 to form a toner image on the photosensitive drum 30a.

The transfer section 32 includes a transport belt 20 and rollers used for transport and transfer. The transfer section 32 carries a recording medium 21 supplied from the paper supply section 33 past each photosensitive drum 30a, allowing the toner image formed on the photosensitive drum 30a to be transferred to the recording medium 21.

The fusing section 31 includes a heating roller 31a with a heating element and temperature detector (not shown). The fusing section 31 fuses the toner image to the recording medium 21 by a combination of heat and pressure.

After leaving the fusing section 31, the recording medium 21 with the fused toner image is carried past an exit sensor 14 and delivered by a pair of delivery rollers 15i, 15j in the delivery section 36 to a tray on the top of the printer. The delivery rollers 15i, 15j and other rollers in FIG. 1 are turned by motors (not shown).

A monochrome printer (not shown) has only one photosensitive section 30, one toner cartridge 34, and one LED head 35.

First Embodiment

Figure 2:
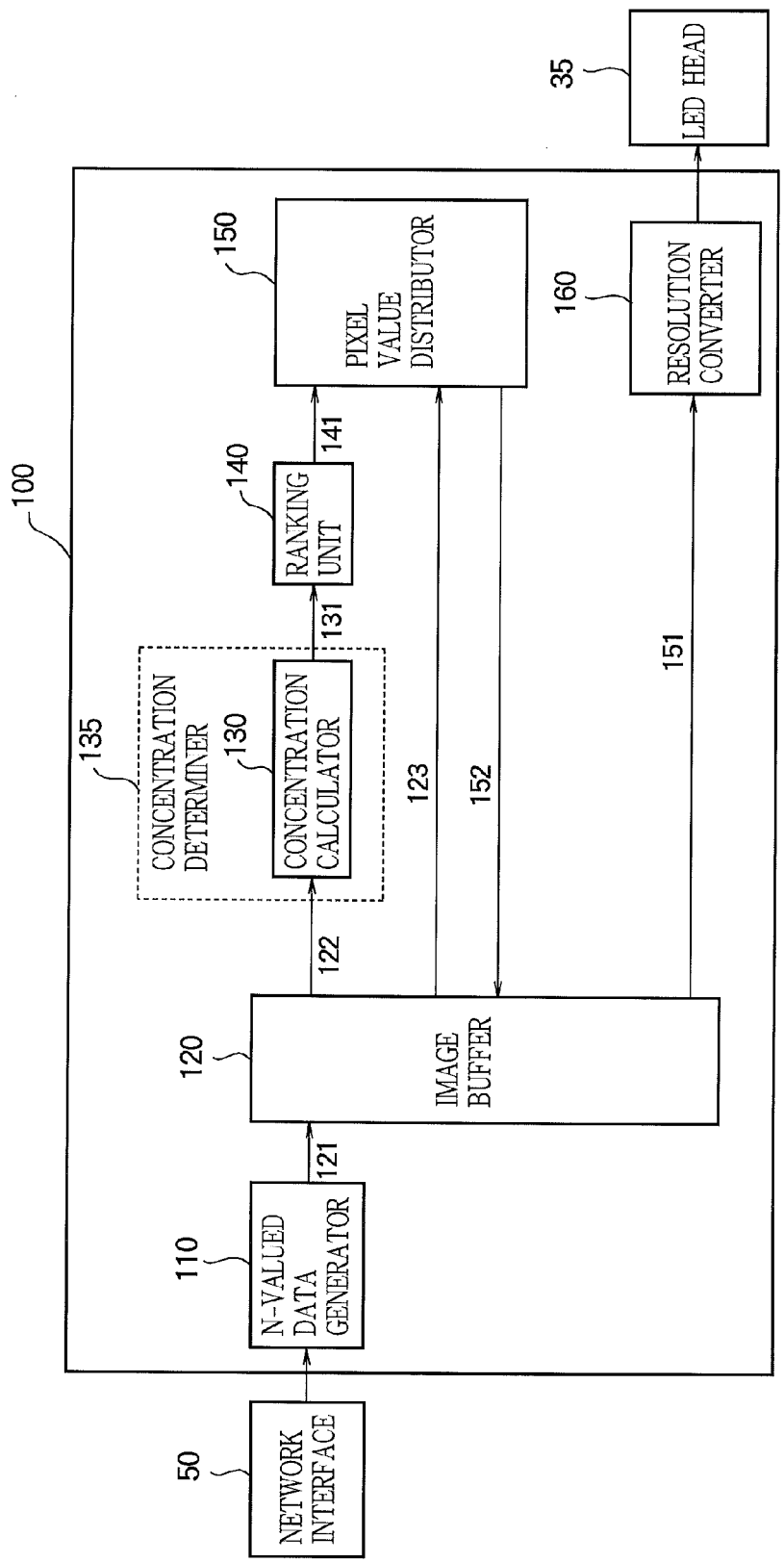
FIG. 2 is a block diagram of the image processing section in a first embodiment of the invention, also showing a network interface and light-emitting diode (LED) head.

Referring to FIG. 2, the first embodiment is an image forming apparatus of the type shown in FIG. 1, including at least one LED head 35, a network interface 50, and the image processing section mentioned above. The network interface 50, like the image processing section 100, was not shown in FIG. 1. The network interface 50 is connected to an external network such as a local area network (LAN), and supplies input image data received from the external network to the image processing section 100. The image processing section 100 processes the input image data and supplies the processed image data to the LED head 35.

The image processing section 100 includes an N-valued data generator 110, an image buffer 120, a concentration calculator 130, a ranking unit 140, a pixel value distributor 150, and a resolution converter 160. In the first embodiment, the concentration calculator 130 constitutes a concentration determiner 135.

Figure 3:
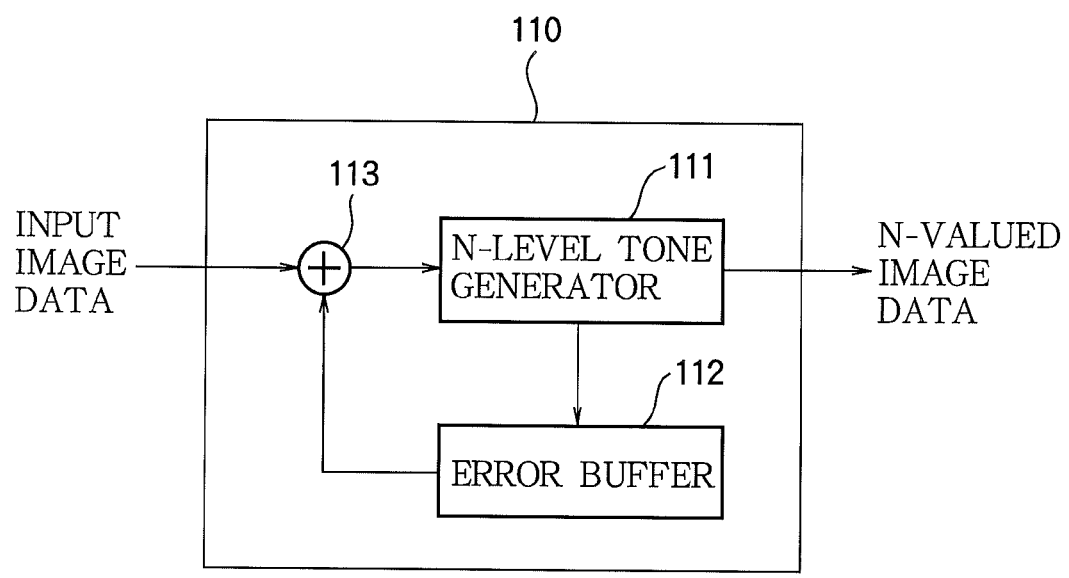
FIG. 3 is an exemplary block diagram of the N-valued conversion processing unit in FIG. 2.

Referring to FIG. 3, the N-valued data generator 110 is an error diffusion circuit of the general type including an N-level tone generator 111, an error buffer 112, and an adder 113. This circuit converts K-bit ($2^K$-valued) input image data to N-valued data in which each pixel has a value from 0 to (N−1), where K and N are integers such that $2 \leq N < 2^K$. In the examples shown below, K is eight ($2^K = 256$) and N is five (N=5).

The present embodiment is not limited to the use of error diffusion. Other methods, such as dithering or density patterns, may be used to convert the input image data to N-valued data.

The image buffer 120 in FIG. 2 stores the individual pixel data received from the N-valued data generator 110.

Figure 4:
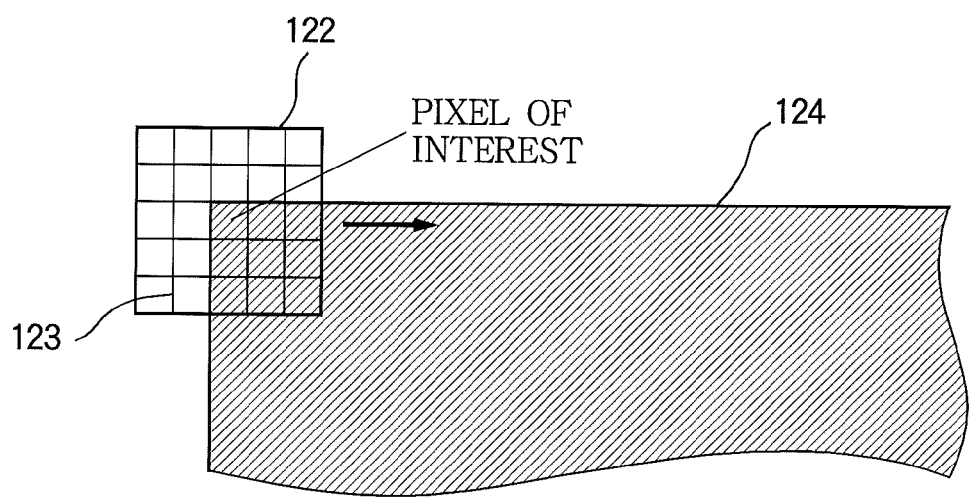
FIG. 4 illustrates the order in which data are read from the image buffer in FIG. 2.

The reading of data from the image buffer 120 is illustrated in FIG. 4. Hatching is used to indicate the image data 124 for one page. When at least three lines of pixels have been stored in the image buffer 120, starting with the pixel located in the top left corner of the page as the pixel of interest, the pixel values in a rectangular area centered on the pixel of interest, for example, a five-by-five array of pixels 122, are read and sent to the concentration determiner 135. The pixel values in another rectangular area centered on the pixel of interest, for example, a three-by-three array of pixels 123, are read and sent to the pixel value distributor 150. For pixels located outside the area of the image data 124, a zero value is sent in place of the non-existent pixel data.

The position of the pixel of interest is shifted to the right one pixel at a time as indicated by the arrow. At each position, the data in the corresponding five-by-five array 122 and three-by-three array 123 are sent to the concentration determiner 135 and pixel value distributor 150, respectively.

After reaching the right end of the first line of image data 124, the pixel of interest returns to the left end of the second line and is then shifted one pixel at a time to the right in the same way, until it reaches the right end of the second line, image data being read and sent at each pixel position. This procedure continues in succeeding lines.

For each pixel of interest, the concentration determiner 135, ranking unit 140, and pixel value distributor 150 process the pixel data as described below. The processed image data are written back into the image buffer 120. When the pixel values in the image buffer 120 have been finalized, they are sent in sequence as image data 151 to the resolution converter 160.

When the concentration calculator 130 in the concentration determiner 135 receives an array of data 122 from the image buffer 120, it calculates concentration values for the pixel of interest and its surrounding pixels. For example, upon receiving the data for a five-by-five array of pixels centered on the pixel of interest, the concentration calculator 130 calculates and outputs concentration values 131 (Cn) for the pixel of interest and its eight neighboring pixels.

In this embodiment, a five-by-five array of pixel values is supplied to the concentration calculator 130 to enable it to determine the concentration values of each pixel in the three-by-three array region centered on the pixel of interest. The concentration value of each pixel is determined from a three-by-three array centered on that pixel. In general, in order to determine the concentration values of the pixels in a P×Q array (measuring P pixels vertically and Q pixels horizontally) by use of an R×S array (measuring R pixels vertically and S pixels horizontally) centered on each pixel, the concentration calculator 130 must be supplied with data for the pixels in a T×U array (measuring T pixels vertically and U pixels horizontally), where the values of T and U are given by the following equations.

$T=(P+R-1) \quad U=(Q+S-1)$

Figure 5A:
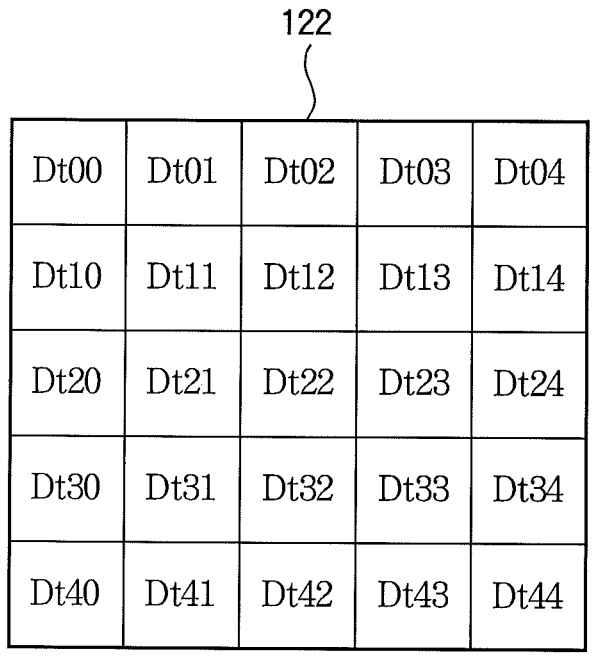
FIG. 5A illustrates notation for a five-by-five array of pixel values.

The pixel values 122 in the five-by-five array supplied from the image buffer 120 to the concentration calculator 130 are denoted as shown in FIG. 5A. Dt22 is the pixel of interest, and the following eight surrounding pixels are its neighboring pixels.

$$\begin{Bmatrix} Dt11, & Dt12, & Dt13, \\ Dt21, & & Dt23, \\ Dt31, & Dt32, & Dt33 \end{Bmatrix}$$

Notation of the general form Dtvh (where v and h are integers) will be used below to designate both individual pixels and their pixel values.

Figure 5B:
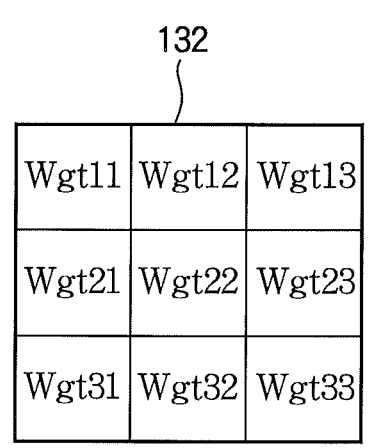
FIG. 5B illustrates notation for weighting coefficients used in the concentration calculator in FIG. 2.

To calculate the concentration values, the concentration calculator 130 uses a weighting filter 132 with an array of weighting coefficients as shown below and in FIG. 5B. These weighting coefficients will also be referred to simply as weights.

$$\begin{Bmatrix} Wgt11, & Wgt12, & Wgt13, \\ Wgt21, & Wgt22, & Wgt23, \\ Wgt31, & Wgt32, & Wgt33 \end{Bmatrix}$$

The concentration values 131 (Cn) of the pixels in the three-by-three rectangular block including the pixel of interest and its eight neighboring pixels are calculated by equations (1a) to (1i), using the pixel values and these weighting coefficients. In general, the weighting coefficient of the pixel of interest (Wgt22 in FIG. 5B) is the largest and the weighting coefficients of the other pixels become smaller with increasing distance from the pixel of interest. Specific examples of weighting coefficients will be shown later.

$$Cn11 = Dt00*Wgt11 + Dt01*Wgt12 + Dt02*Wgt13 + \\ Dt10*Wgt21 + Dt11*Wgt22 + Dt12*Wgt23 + \\ Dt20*Wgt31 + Dt21*Wgt32 + Dt22*Wgt33 \quad (1a)$$

$$Cn12 = Dt01*Wgt11 + Dt02*Wgt12 + Dt03*Wgt13 + \\ Dt11*Wgt21 + Dt12*Wgt22 + Dt13*Wgt23 + \\ Dt21*Wgt31 + Dt22*Wgt32 + Dt23*Wgt33 \quad (1b)$$

$$Cn13 = Dt02*Wgt11 + Dt03*Wgt12 + Dt04*Wgt13 + \\ Dt12*Wgt21 + Dt13*Wgt22 + Dt14*Wgt23 + \\ Dt22*Wgt31 + Dt23*Wgt32 + Dt24*Wgt33 \quad (1c)$$

$$Cn21 = Dt10*Wgt11 + Dt11*Wgt12 + Dt12*Wgt13 + \\ Dt20*Wgt21 + Dt21*Wgt22 + Dt22*Wgt23 + \\ Dt30*Wgt31 + Dt31*Wgt32 + Dt32*Wgt33 \quad (1d)$$

$$Cn22 = Dt11*Wgt11 + Dt12*Wgt12 + Dt13*Wgt13 + \\ Dt21*Wgt21 + Dt22*Wgt22 + Dt23*Wgt23 + \\ Dt31*Wgt31 + Dt32*Wgt32 + Dt33*Wgt33 \quad (1e)$$

$$Cn23 = Dt12*Wgt11 + Dt13*Wgt12 + Dt14*Wgt13 + \\ Dt22*Wgt21 + Dt23*Wgt22 + Dt24*Wgt23 + \\ Dt32*Wgt31 + Dt33*Wgt32 + Dt34*Wgt33 \quad (1f)$$

$$Cn31 = Dt20*Wgt11 + Dt21*Wgt12 + Dt22*Wgt13 + \\ Dt30 + Wgt21 + Dt31*Wgt22 + Dt32*Wgt23 + \\ Dt40*Wgt31 + Dt41*Wgt32 + Dt42*Wgt33 \quad (1g)$$

$$Cn32 = Dt21*Wgt11 + Dt22*Wgt12 + Dt23*Wgt13 + \\ Dt31*Wgt21 + Dt32*Wgt22 + Dt33*Wgt23 + \\ Dt41*Wgt31 + Dt42*Wgt32 + Dt43*Wgt33 \quad (1h)$$

$$Cn33 = Dt22*Wgt11 + Dt23*Wgt12 + Dt24*Wgt13 + \\ Dt32*Wgt21 + Dt33*Wgt22 + Dt34*Wgt23 + \\ Dt42*Wgt31 + Dt43*Wgt32 + Dt44*Wgt33 \quad (1i)$$

In the above equations, Cn11, Cn12, Cn13, Cn21, Cn22, Cn23, Cn31, Cn32, Cn33 represent concentration values for pixels Dt11, Dt12, Dt13, Dt21, Dt22, Dt23, Dt31, Dt32, Dt33, respectively. In general, the concentration value Cnvh of pixel Dtvh can be obtained by the following equation (1j), in which elements in corresponding positions in the two arrays are multiplied together and the resulting products are summed.

$$Cnvh = \begin{bmatrix} Dt(v-1)(h-1) & Dt(v-1)h & Dt(v-1)(h+1) \\ Dtv(h-1) & Dtvh & Dtv(h+1) \\ Dt(v+1)(h-1) & Dt(v+1)h & Dt(v+1)(h+1) \end{bmatrix} \times \begin{bmatrix} Wgt11 & Wgt21 & Wgt31 \\ Wgt12 & Wgt22 & Wgt32 \\ Wgt13 & Wgt23 & Wgt33 \end{bmatrix}$$ (1j)

Figure 6:
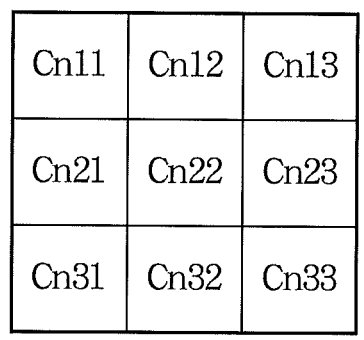
FIG. 6 illustrates notation for concentration values in a three-by-three array of pixels.

The concentration values Cn11 to Cn33 are set in an array in the order of the corresponding pixels Dt11 to Dt33, as shown in FIG. 6.

The concentration value of a pixel represents the concentration of image intensity at or around the pixel. When pixel values are redistributed, they are redistributed from areas of relatively low concentration to areas of higher concentration, so that concentrated areas become even more concentrated and pixels of low concentration tend to be eliminated. The pixel values thus become more clustered. As the distribution process is based on relative concentration value, it increases clustering more effectively than do distribution processes based only on individual pixel value or pixel position.

In this embodiment, each concentration value 131 (Cn) is obtained by multiplying the pixel values in a three-by-three array by the corresponding coefficients of the weighting filter 132 and summing the results, but an alternative method in which the concentration values are found by use of a look-up table is also contemplated.

The concentration values 131 (Cn) obtained by the concentration calculator 130 are supplied as the output of the concentration determiner 135 to the ranking unit 140.

The ranking unit 140 ranks the pixel of interest and its neighboring pixels according to the concentration values 131 (Cn) received from the concentration determiner 135.

More specifically, the ranking unit 140 receives the concentration values Cnvh 131 for a three-by-three array including the pixel of interest and its eight neighboring pixels, and calculates and outputs rank values Rnkvh 141 for these pixels (v=1, 2, 3, h=1, 2, 3). The rank values 141 are used as described later to determine priorities when the pixel value of the pixel of interest is distributed. The rank values Rnkvh of the pixel of interest and its eight neighboring pixels are determined by comparing their concentration values. Roughly speaking, the pixels are ranked in reverse order of their concentration values. The rank value of the pixel of interest is set at the number of the results of the comparison indicating that the concentration value of the pixel of interest is smaller than the concentration value of each of the neighboring pixels, or the number of the results of the comparison indicating that the concentration value of the pixel of interest is not larger than the concentration value of each of the neighboring pixels. For example, the rank values 141 (Rnk11 to Rnk33) for the individual pixels are calculated from the following equations (2a) to (2i) and output to the pixel value distributor 150.

$$Rnk11 = J(Cn11 < Cn12) + J(Cn11 < Cn13) + \\ J(Cn11 < Cn21) + J(Cn11 < Cn22) + J(Cn11 < Cn23) + \\ J(Cn11 < Cn31) + J(Cn11 < Cn32) + J(Cn11 < Cn33)$$ (2a)

$$Rnk12 = J(Cn12 \le Cn11) + J(Cn12 < Cn13) + \\ J(Cn12 < Cn21) + J(Cn12 < Cn22) + J(Cn12 < Cn23) + \\ J(Cn12 < Cn31) + J(Cn12 < Cn32) + J(Cn12 < Cn33)$$ (2b)

$$Rnk13 = J(Cn13 \le Cn11) + J(Cn13 \le Cn12) + \\ J(Cn13 < Cn21) + J(Cn13 < Cn22) + J(Cn13 < Cn23) + \\ J(Cn13 < Cn31) + J(Cn13 < Cn32) + J(Cn13 < Cn33)$$ (2c)

$$Rnk21 = J(Cn21 \le Cn11) + J(Cn21 \le Cn12) + \\ J(Cn21 \le Cn13) + J(Cn21 < Cn22) + J(Cn21 < Cn23) + \\ J(Cn21 < Cn31) + J(Cn21 < Cn32) + J(Cn21 < Cn33)$$ (2d)

$$Rnk22 = J(Cn22 \le Cn11) + J(Cn22 \le Cn12) + \\ J(Cn22 \le Cn13) + J(Cn22 \le Cn21) + J(Cn22 < Cn23) + \\ J(Cn22 < Cn31) + J(Cn22 < Cn32) + J(Cn22 < Cn33)$$ (2e)

$$Rnk23 = J(Cn23 \le Cn11) + J(Cn23 \le Cn12) + \\ J(Cn23 \le Cn13) + J(Cn23 \le Cn21) + J(Cn23 \le Cn22) + \\ J(Cn23 < Cn31) + J(Cn23 < Cn32) + J(Cn23 < Cn33)$$ (2f)

$$Rnk31 = J(Cn31 \le Cn11) + J(Cn31 \le Cn12) + \\ J(Cn31 \le Cn13) + J(Cn31 \le Cn21) + J(Cn31 \le Cn22) + \\ J(Cn31 \le Cn23) + J(Cn31 < Cn32) + J(Cn31 < Cn33)$$ (2g)

$$Rnk32 = J(Cn32 \le Cn11) + J(Cn32 \le Cn12) + \\ J(Cn32 \le Cn13) + J(Cn32 \le Cn21) + J(Cn32 \le Cn22) + \\ J(Cn32 \le Cn23) + J(Cn32 \le Cn31) + J(Cn32 < Cn33)$$ (2h)

$$Rnk33 = J(Cn33 \le Cn11) + J(Cn33 \le Cn12) + \\ J(Cn33 \le Cn13) + J(Cn33 \le Cn21) + J(Cn33 \le Cn22) + \\ J(Cn33 \le Cn23) + J(Cn33 \le Cn31) + J(Cn33 \le Cn32)$$ (2i)

The value of J(**) in the above equations is '1' if the condition shown in parentheses is true and '0' if it is not true.

Figures 7, 8:
FIG. 7 illustrates notation for rank values in the three-by-three array of pixels.
FIG. 8 illustrates notation for pixel values in the three-by-three array of pixels.

In the above equations, Rnk11, Rnk12, Rnk13, Rnk21, Rnk22, Rnk23, Rnk31, Rnk32, and Rnk33 are rank values for pixels Dt11, Dt12, Dt13, Dt21, Dt22, Dt23, Dt31, Dt32, and Dt33 in FIG. 5A, respectively. The rank values Rnk11 to Rnk33 are set in an array as shown in FIG. 7 according to the order of the corresponding pixels.

Since 0s and 1s representing the results of eight comparisons are summed in the equation for determining each rank value Rnk11 to Rnk33, each rank value is an integer from zero to eight. Rank eight is the lowest rank. The rank rises as the numerical rank value decreases (7, 6, 5, . . . ), with zero (0) being the highest rank. Determining the numerical rank values is equivalent to determining ranks.

The numerical rank value Rnk of a pixel increases (the rank of the pixel decreases) as the number of other pixels located above or directly to the left of the pixel in the three-by-three array centered on the pixel of interest and having equal or higher concentration values increases, and as the number of pixels located below or directly to the right of the pixel in the three-by-three array and having higher concentration values increases.

The pixel value distributor 150 uses the pixel rank values 141 (Rnk11 to Rnk33) obtained by the ranking unit 140 to distribute the pixel value of the pixel of interest to the eight neighboring pixels. Pixels with numerically higher Rnk values and thus with lower ranks are given lower priority in this distribution.

The pixel values of the pixel of interest and its eight neighboring pixels (pixels 123 in the three-by-three array) are supplied to the pixel value distributor 150 from the image buffer 120.

FIG. 8 shows the three-by-three array of pixel values 123 input to the pixel value distributor 150, including pixel values Dt11, Dt12, Dt13, Dt21, Dt22, Dt23, Dt31, Dt32, Dt33 from the five-by-five array of pixels 122 (FIG. 5A) input to the ranking unit 140.

The process by which the pixel value distributor 150 distributes pixel values will now be described with reference to the flowchart in FIG. 9. The terms 'saturated' and 'non-saturated' will be used. A saturated pixel is a pixel with the maximum possible pixel value (N−1); a non-saturated pixel is a pixel with a lower pixel value.

First, a candidate receiving pixel rank variable Drnk is initialized to zero (0) (step F101). Drnk indicates the rank of the pixel that is currently a candidate to receive pixel value from the pixel of interest. Pixel value can be distributed only to higher-ranking pixels. If the rank value of the pixel of interest is lower (numerically greater) than Drnk, as much pixel value as possible is distributed from the pixel of interest to the neighboring pixel of rank Drnk. If the rank of the pixel of interest is equal to or higher than (numerically equal to or less than) Drnk, no pixel value is distributed.

In step F102, whether the pixel value Dt22 of the pixel of interest is zero is decided. If Dt22 is zero (Yes in step F102), then there is no pixel value to distribute and the distribution process ends; if Dt22 has a non-zero value (No in step F102), the process proceeds to step F103.

In step F103, whether the rank value Rnk22 of the pixel of interest Dt22 is numerically equal to or less than Drnk is decided. If Rnk22 is equal to or less than Drnk (if Yes), pixel value is not distributed, and the process ends; if Rnk22 is numerically higher than Drnk (if No), the process proceeds to step F104.

In step F104, the rank values $$\left\{ \begin{array}{ccc} Rnk11, & Rnk12, & Rnk13, \\ Rnk21, & & Rnk23, \\ Rnk31, & Rnk32, & Rnk33 \end{array} \right\}$$

of the pixels other than the pixel of interest are searched to find the rank equal to the candidate receiving pixel rank Drnk, the pixel of rank Drnk is set as the receiving pixel, and its pixel value is obtained as the receiving pixel value T_Dt. The receiving pixel value T_Dt and the value of the pixel of interest Dt22 are added to obtain their sum (T_Dt+Dt22).

Next, whether the sum (T_Dt+Dt22) is greater than the maximum possible pixel value (N−1) is decided in step F105. If the sum is greater (if Yes), the process proceeds to step F108; otherwise (if No), the process proceeds to step F106.

In step F106, the receiving pixel value is changed to T_Dt+Dt22, which is set as the new T_Dt value. Then the value of the pixel of interest is changed to zero (step F107) and the distribution process ends.

Steps F106 and F107 distribute the entire pixel value of the pixel of interest Dt22 before the start of step F106 to a pixel having a higher (numerically smaller) rank. If the sum (T_Dt+Dt22) equals (N−1), this transfer saturates the receiving pixel.

Figure 9:
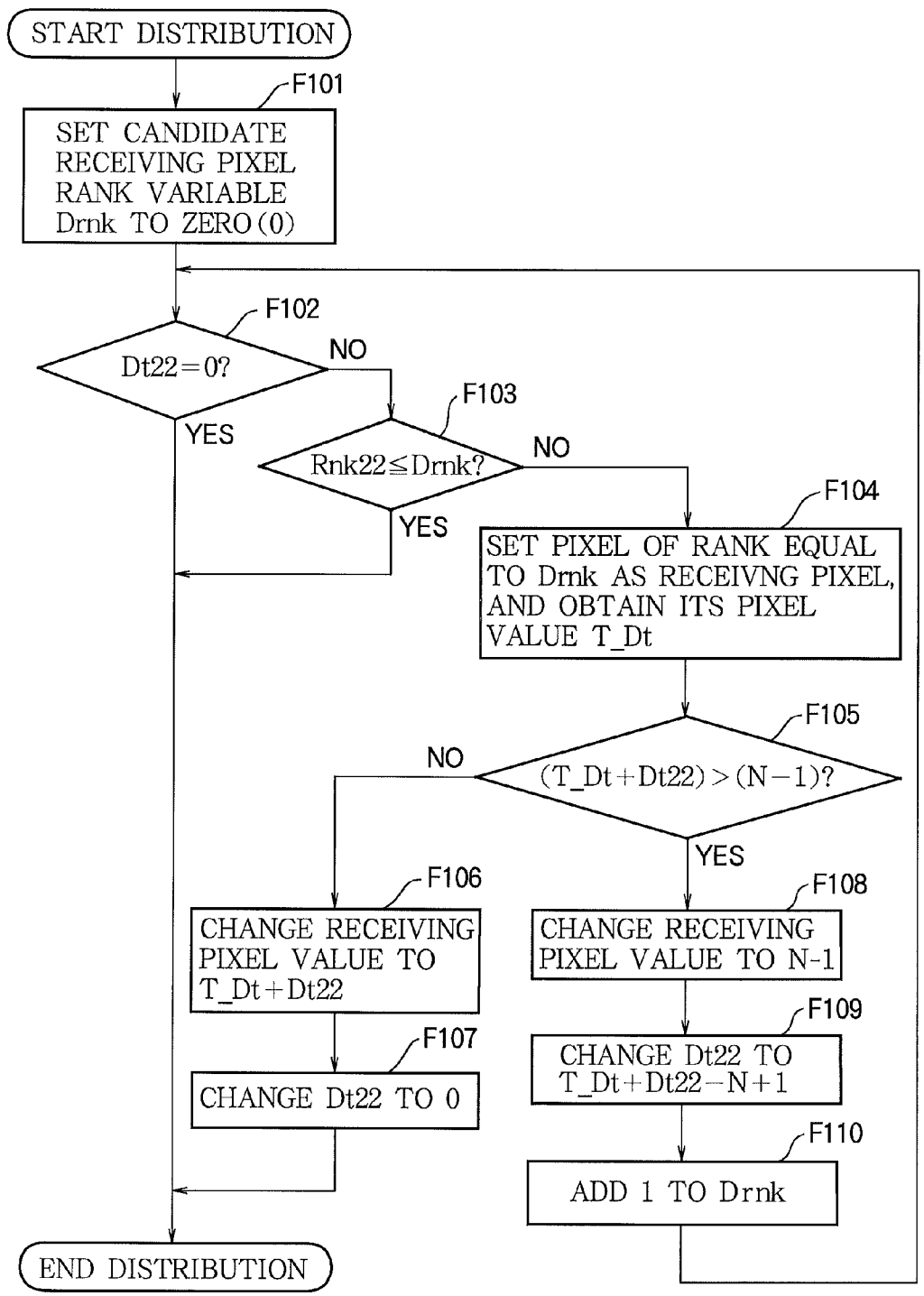
FIG. 9 is a flowchart of the distribution process carried out by the pixel value distributor in FIG. 2.

The pixel value of the pixel of interest at the start of step F106 is not necessarily the same as the pixel value at the start of the process in FIG. 9. The pixel value of the pixel of interest may have already been changed in a previous execution of step F109 in FIG. 9.

In step F108, the pixel value of the receiving pixel is changed to the maximum value (N−1). This transfer distributes part of the pixel value of the pixel of interest Dt22 before the start of step F108 to a pixel with a higher (numerically smaller) rank, saturating the receiving pixel.

The pixel value of the pixel of interest is then changed from (T_Dt+Dt22) to a value (T_Dt+Dt22−N+1) obtained by subtracting the maximum value (N−1) from the sum value (step F109).

Next, in step F110, one (1) is added to the candidate receiving pixel rank value Drnk and the process returns to step F102.

The processing from step F102 to step F110 is iterated until the decision result in step F102 or F103 becomes Yes. The receiving pixel rank value Drnk is incremented (reduced in rank and priority) by one at each iteration.

The distribution processing described above updates the pixel values of the pixel of interest and its eight neighboring pixels. The update is carried out by distributing as much pixel value as possible from the pixel of interest to neighboring pixels that outrank the pixel of interest, saturating those pixels, if possible, in descending order of their ranks (ascending numerical order of their Rnk values).

The updated pixel values 152 of the pixel of interest and the eight neighboring pixels are input to the image buffer 120, in which the corresponding pixel values Dt11, Dt12, Dt13, Dt21, Dt22, Dt23, Dt31, Dt32, and Dt33 are updated.

After this processing is completed, the next pixel of interest is processed, using the updated pixel values in the image buffer 120. The next pixel of interest is either the pixel to the right of the pixel of interest that has just been processed, or the leftmost pixel in the next line. The image buffer 120 supplies the pixel values 122 of a new five-by-five array of pixels centered on this next pixel of interest to the concentration determiner 135, and supplies the pixel values 123 of a new three-by-three array of pixels to the pixel value distributor 150. New concentration values and rank values are calculated and the pixel value of the new pixel of interest is distributed to pixels in the three-by-three array of pixels as described above.

When the above processing is implemented by circuitry, for example, it is possible to limit the candidate receiving pixels to the N−1 highest-ranking non-saturated pixels among the eight neighboring pixels, thereby reducing the number of inputs to be processed. For example, when the distribution processing is carried out on five-valued pixel data (N=5), the candidate receiving pixels can be limited to the four highest-ranking non-saturated pixels. Saturated pixels can be eliminated because they already have the maximum possible pixel value. The reason for the limit of four pixels is that the maximum pixel value of the pixel of interest is four (4), so even the entire value is distributed in units of one (1), at most four neighboring pixels can receive parts of the value.

The resolution converter 160 receives the finalized N-valued pixel data 151 output from the image buffer 120, converts each pixel value to a binary bit pattern for controlling the light-emitting elements (LEDs) of the LED head 35, then converts the bit patterns to lines of bit data oriented in the main scanning direction (the horizontal direction on the page) and sends the resulting bit data to the LED head 35.

Exemplary bit pattern conversions carried out by the resolution converter 160 will be shown in FIG. 10 and FIGS. 11A to 11C. In the examples in these drawings, five-valued pixel data (N=5) with 1200×1200 dot per inch (dpi) resolution are converted to 2400×2400 dpi bit patterns.

Figures 10, 11A, 11B, 11C:
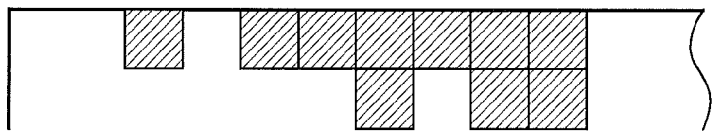
FIG. 10 illustrates a correspondence between five-valued image data and bit patterns used by the resolution converter.
FIG. 11A shows the bit patterns in FIG. 10 placed side by side.
FIG. 11B shows the bit patterns in FIG. 11A converted to horizontally continuous lines of bit data.
FIG. 11C shows the toner pattern formed from the bit data in FIG. 11B.

The values '0' to '4' in the pixel data column in FIG. 10 are the input 1200×1200 dpi pixel values. The values '0' and '1' in the squares of the matrices shown in the bit pattern column denote 2400×2400 dpi pixel values. Taking the pixel values in each matrix in the sequence of upper left, upper right, lower left, and lower right, an input '0' is converted to the bit pattern '0000'; an input '1' is converted to the bit pattern '1000'; an input '2' is converted to the bit pattern '1100'; an input '3' is converted to the bit pattern '1110'; an input '4' is converted to the bit pattern '1111'.

The 2400×2400 dpi pixels will also be referred to as subpixels or dots to distinguish them from 1200×1200 dpi pixels.

As an example, FIGS. 11A and 11B illustrate the conversion of these five pixel values when they occur consecutively in the horizontal (main scanning) direction.

FIG. 11A shows the 2400×2400 dpi bit patterns '0000', '1000', '1100', '1110', '1111', . . . in FIG. 10 placed side by side. In FIG. 11B, the first line in FIG. 11A is converted to a horizontal line of bit data with bit values '0010111111 . . . ', and the next line in FIG. 11A is converted to a horizontal line of bit data with bit values '0000001011 . . . '. These lines of converted bit data are sent to the LED head 35.

When a bit in a horizontal line of bit data is '1', the LED head 35 turns on the light emitting element located at the corresponding position, forming an electrostatic dot on the photosensitive drum. The image forming process described earlier creates a toner image (FIG. 11C) corresponding to the dot pattern on paper or other media.

Specific examples of the operation of the concentration calculator 130, ranking unit 140, pixel value distributor 150, and resolution converter 160 for two sets of weighting coefficients will now be described with reference to FIGS. 12A, 12B, 13A, 13B, and 14A to 14E. The input image, shown in FIG. 12A, is a hypothetical five-valued image with pixel coordinates (0, 0) in the top left corner and (7, 4) in the bottom right corner.

In each pair of coordinates (x, y), x denotes horizontal position and y denotes vertical position. These coordinates differ from the suffixes v and h that denote vertical position (v) and horizontal position (h) in the pixel data Dtvh, concentration values Cnvh, and rank values Rnkvh.

The two sets of the weighting coefficients are shown in FIGS. 13A and 13B. These figures correspond to FIG. 5B; they show the values of Wgt11, Wgt12, Wgt13, Wgt21, Wgt22, Wgt23, Wgt31, Wgt32, Wgt33 used by the weighting filter 132 in the concentration calculator 130. In the example in FIG. 13A (filter setting 1), the pixel of interest has a positive weight (32) and its eight neighboring pixels all have zero weight. In the example in FIG. 13B (filter setting 2), the pixel of interest has the same positive weight (32) and the eight neighboring pixels have smaller positive weights (8 and 4).

The values of weights are determined according to the desired characteristics. The different sets of weights lead to different concentrations and ranks and different output bit patterns. When the pixel of interest is located at (1, 1) in FIG. 12A, for example, the concentration values output by the concentration calculator 130 with the two filter settings are as follows.

$$\left\{ \begin{array}{lll} Cn11 = 0, & Cn12 = 0, & Cn13 = 0, \\ Cn21 = 0, & Cn22 = 32, & Cn23 = 32, \\ Cn31 = 0, & Cn32 = 0, & Cn33 = 64 \end{array} \right\} \quad \text{(Filter setting 1)}$$

$$\left\{ \begin{array}{lll} Cn11 = 4, & Cn12 = 12, & Cn13 = 16, \\ Cn21 = 8, & Cn22 = 48, & Cn23 = 64, \\ Cn31 = 4, & Cn32 = 28, & Cn33 = 84 \end{array} \right\} \quad \text{(Filter setting 2)}$$

Since the pixel with coordinates (1, 1) is the first non-zero pixel in FIG. 12A, the first actual distribution takes place when this pixel is processed. The concentration values 131 (Cn) obtained by the concentration calculator 130 are input to the ranking unit 140. The pixel rank values output from the ranking unit 140 are as follows. At both filter settings, the lower right neighboring pixel has the highest rank.

$$\left\{ \begin{array}{lll} Rnk11 = 3, & Rnk12 = 4, & Rnk13 = 5, \\ Rnk21 = 6, & Rnk22 = 1, & Rnk23 = 2, \\ Rnk31 = 7, & Rnk32 = 8, & Rnk33 = 0 \end{array} \right\}$$

In accordance with these pixel rank values, the pixel value distributor 150 transfers the pixel value ('1') of the pixel of interest to the neighboring pixel at its lower right, and writes the new pixel values Dtb11 to Dtb33 of the three-by-three array of pixels centered on the pixel of interest back into the image buffer 120 as follows.

$$\left\{ \begin{array}{lll} Dtb11 = 0, & Dtb12 = 0, & Dtb13 = 0, \\ Dtb21 = 0, & Dtb22 = 0, & Dtb23 = 1, \\ Dtb31 = 0, & Dtb32 = 0, & Dtb33 = 3 \end{array} \right\}$$

These values update the pixel values in the image buffer 120 for the following coordinate positions, which designate the pixel of interest and its eight neighboring pixels:

$$\left\{ \begin{array}{lll} (0, 0), & (1, 0), & (2, 0), \\ (0, 1), & (1, 1), & (2, 1), \\ (0, 2), & (1, 2), & (2, 2) \end{array} \right\}$$

The image buffer 120 now holds the data shown in FIG. 12B.

The next pixel of interest is processed similarly. As noted above, the next pixel of interest is either the pixel at the right of the pixel just processed or the pixel at the left end of the next line. In the present example, since the pixel at (1, 1) has just been processed, the coordinates of the next pixel of interest are (2, 1), obtained by adding one to the x-coordinate. If the next pixel of interest were at the left end of the next line, one would be added to the y-coordinate and the x-coordinate would be set to zero.

The above processing is iterated until the last pixel has been processed. In the present example, the last pixel is the pixel at position (7, 4) in FIGS. 12A and 12B.

FIGS. 14A and 14B show the five-valued image data after the completion of the distribution processing for the two exemplary filter settings. FIGS. 14C and 14D show the corresponding output patterns. If the resolution in FIGS. 14A and 14B is 1200×1200 dpi, the resolution of the dot patterns in FIGS. 14C and 14D is 2400×2400 dpi, but for consistency, FIGS. 14C and 14D show coordinate values for 1200×1200 dpi resolution. FIGS. 14C and 14D also represent the toner image formed on the output media.

With filter setting 1, as shown in FIG. 14C, the output bit pattern has compact clusters of about two to five pixels. With filter setting 2, as shown in FIG. 14D, the bit pattern has compact clusters of about four to eight pixels.

FIG. 14E shows the 2400×2400 dpi bit pattern that would be created by the resolution converter 160 from the image data in FIG. 12A without distribution processing by the concentration calculator 130, ranking unit 140, and pixel value distributor 150. The bit pattern now has clusters of only one or two pixels.

As can be seen from FIGS. 14C to 14E, the distribution process carried out by the concentration calculator 130, ranking unit 140, and pixel value distributor 150 enables the image data to be reproduced by larger clusters of pixels of about two to five pixels or about four to eight pixels. The advantage of using larger clusters is that in general, image forming apparatuses can reproduce large clusters more faithfully than small clusters.

Electrophotographic image forming apparatuses have particular difficulty in reproducing pixels or pixel clusters smaller than the toner particle size. Either no toner is transferred, or more toner than intended is transferred. The transfer or non-transfer of toner becomes a somewhat random occurrence. For this reason, the tones represented by high-definition image data or dot patterns are not always faithfully reproduced. The use of larger clusters of pixels can improve the fidelity of tone reproduction by ensuring a more accurate transfer of the intended amount of toner. Even when the original image tones cannot be reproduced accurately by using clusters of only one or two pixels, tones close to the original tones can be obtained by using larger clusters.

Another effect of the novel method of clustering black pixels adopted in the present invention, using concentration values and ranks to redistribute pixel values toward points of high concentration, is that the clustering is made to occur naturally, instead of occurring at fixed positions as in a halftone screen pattern. A particular advantage is that since pixel clusters are formed under uniform conditions, output tones grade smoothly, without abrupt step-like changes in intensity, resulting in improved image quality.

A further advantage is that the filter setting of the concentration calculator 130 can be changed to adjust the degree of clustering to suit the characteristics of the image forming apparatus. If the characteristics dictate an optimum cluster size, for example, the weighting coefficients can be selected to produce that size. By selection of suitable coefficients it is possible to avoid over-clustering, which leads to poor resolution.

For example, the weighting coefficients in FIG. 13A (filter setting 1) produce bit patterns with clusters spaced at intervals of about two pixels in terms of the original pixel resolution (1200 dpi in the example above). The bit patterns formed by the weighting coefficients in FIG. 13B (filter setting 2) produce clusters spaced at intervals of about three pixels.

$$\begin{Bmatrix} 0, & 0, & 0, \\ 0, & 32, & 0, \\ 0, & 0, & 0 \end{Bmatrix} \quad \text{Filter setting 1}$$

$$\begin{Bmatrix} 4, & 8, & 4, \\ 8, & 32, & 8, \\ 4, & 8, & 4 \end{Bmatrix} \quad \text{Filter setting 2}$$

Accordingly, filter setting 1 provides an effect analogous to that of a halftone screen with about 600 lines per inch, while filter setting 2 provides an effect analogous to that of a screen with about 400 lines per inch. In the x-direction, if the weights in the weighting filter are scaled so that the weight of the pixel of interest is 1.0, the equivalent halftone line interval of the resulting pattern is substantially double the total sum of the weights of the pixel of interest and the pixels to its right and left. This value can be used to divide the resolution (1200 dpi in this embodiment) of the original image to obtain the approximate equivalent number of halftone screen lines.

There are widely used amplitude modulation (AM) screening techniques that produce density patterns resembling halftone dots disposed at a fixed intervals, with a constant number of screen lines per inch. In these techniques there is a tradeoff between tone reproduction and edge reproduction. It is possible to use one set of density patterns in edge areas and another set in non-edge areas, but the switchover between the two sets produces obvious image discontinuities. The weighting filter in the present embodiment can approximate such switchable screen patterns without producing discontinuities.

In determining the screen conditions or characteristics for AM screening, many factors need to be taken into consideration, including process factors such as dot instability and the tone scale and other factors such as color moire patterns, printing mode policy (resolution priority etc.), and so on. In the application of this embodiment of the invention there are similar factors to consider, but the equivalent number of screen lines (the resolution) can be adjusted easily by switching weighting coefficients, and fine adjustment is possible. This is another advantage of the present invention.

Yet another advantage is that at edges where there is a high pixel density in the original image, the clustering of dots follows the edge, so even if the cluster size is increased and the resolution is lowered as a result, letters and other objects in the original image are reproduced without deformation of their contours. Still another advantage is that by making minimum alterations (simply by increasing the degree of pixel clustering) the present embodiment can reproduce faint letters, thin lines, and other features that present problems for the developing processes in some types of image forming apparatuses.

Since alterations are made according to a common rule applied over the entire tone scale, continuity (in perceived pattern effects and resolution) is provided in the appearance of features that grade in tone level, so that the reproduced gradation comes out well.

In this embodiment, the pixel value of the pixel of interest is distributed so as to saturate neighboring pixels in order of their assigned ranks (Rnk). In a variation of this rule, distribution may stop short of saturation: the pixel value of the pixel of interest is distributed so that the neighboring pixels are nearly saturated in order of their ranks.

In another variation, the strict inequality signs (<) and non-strict inequality signs (≤) in the equations (2a-2i) defining the ranks are interchanged. This variation will be used implicitly in some of the examples given below.

Second Embodiment

Referring to FIG. 15, the second embodiment is an image forming apparatus that includes the same LED head 35 and network interface 50 as in the first embodiment but has a modified image processing section 200. The image processing section 200 differs from the image processing section 100 shown in FIG. 2 in the first embodiment in that the concentration determiner 135 includes a pixel state calculator 210 and a concentration modifier 220 in addition to the concentration calculator 130.

The pixel state calculator 210 makes a decision about the state of the pixel of interest, and the concentration modifier 220 alters the concentration values of the pixels calculated by the concentration calculator 130 according to this decision. The pixel values 123 of the three-by-three array of pixels supplied from the image buffer 120 to the pixel value distributor 150 are also supplied to the pixel state calculator 210. The concentration modifier 220 receives data 211 from the pixel state calculator 210 and data 131 from the concentration calculator 130, and outputs data 221 to the ranking unit 140.

The pixel values 123 in the three-by-three array will be denoted Dt22 (the pixel of interest) and Dt11, Dt12, Dt13, Dt21, Dt23, Dt31, Dt32, Dt33 (its eight neighboring pixels) as in the first embodiment. The pixel state calculator 210 makes a prescribed decision about the state of each pixel, based on its pixel value, and combines these state decision results to obtain a total state decision for the pixel of interest. The result of the total state decision is output in the data 211 sent to the concentration modifier 220.

Two different decision methods (decision method 1 and decision method 2) that may be used by the pixel state calculator 210 will now be described with reference to FIGS. 16A, 16B, and 17. Which decision method to use may be preset for each image forming apparatus, or the method may be user-selectable.

Decision Method 1

Decision method 1 uses a decision filter 212 shown in FIG. 16A. The decision filter 212 has a three-by-three array of elements Ptnvh that correspond to the input pixel values Dtvh (v=1, 2, 3, h=1, 2, 3) as shown below.

$$\begin{Bmatrix} Ptn11, & Ptn12, & Ptn13, \\ Ptn21, & Ptn22, & Ptn23, \\ Ptn31, & Ptn32, & Ptn33 \end{Bmatrix}$$

$$\begin{Bmatrix} Dt11, & Dt12, & Dt13, \\ Dt21, & Dt22, & Dt23, \\ Dt31, & Dt32, & Dt33 \end{Bmatrix}$$

Each filter element Ptnvh includes Reverse and Lower flags and a Pix value as shown in FIG. 16B (in which the filter element is denoted Ptn**). First and second decisions are made for each input pixel according to these parameters of the corresponding filter element, and the second decision results are combined. The decision processing will now be described.

When the Lower flag has a value of one ('1'), whether the pixel value is less than the Pix value is decided. The first decision result is set to one ('1') if the pixel value is less than the Pix value, and to zero ('0') otherwise.

When the Lower flag has a value of zero ('0'), whether the pixel value is equal to the Pix value is decided. The first decision result is set to one ('1') if the pixel value is equal to the Pix value, and to zero ('0') otherwise.

When the Reverse flag has a value of one ('1'), the reverse of the first decision result is set as the second decision result: if the first decision result is zero ('0'), the second decision result is one ('1'); if the first decision result is one ('1'), the second result is zero ('0').

When the Reverse flag has a value of zero ('0'), the first decision result becomes the second decision result: if the first decision result is zero ('0'), the second decision result is zero ('0'); if the first decision result is one ('1'), the second result is one ('1').

These decisions are made for each pixel in the three-by-three array. If the second decision result for all the pixels is one ('1'), the total state decision result output from the pixel state calculator 210 is set to one ('1'); otherwise, the total state decision result is set to zero ('0').

Decision method 1 can be used to determine whether the pixel of interest and its neighboring pixels, or a selected subset thereof, have prescribed values or form a prescribed pattern.

Decision Method 2

Decision method 2 uses externally input image information not indicated in FIG. 15. An example of decision method 2 will be described with reference to FIG. 17. The externally input image information is the original eight-bit pixel value of the pixel of interest before conversion to an N-valued pixel value. This original value can range from 0 to 255. If the original pixel value of the pixel of interest is within a prescribed range centered substantially at the central value (128), e.g., from 112 to 143, that is, from (128−16) to (128+15), the decision result is one ('1'); otherwise, the decision result is zero ('0').

Instead of the original value of the pixel of interest, other image information may be used. For example, image area information indicating whether the pixel belongs to the edge of a letter may be used, or positional information concerning the position of the pixel of interest within the image may be used. An example of image area information is the edge information generated by the characteristic information generator 510, shown in FIG. 35, that will be described in the fifth embodiment. An example of positional information is the x-direction pixel position 414 and y-direction pixel position 415, indicated in FIG. 29, that will be described in the fourth embodiment.

The concentration modifier 220 alters the concentration values 131 (Cn) obtained in the concentration calculator 130, on the basis of the decision result data 211 obtained from the pixel state calculator 210, and outputs the modified values as concentration values 221 to the ranking unit 140.

FIGS. 18A and 18B show exemplary offsets that the concentration modifier 220 may use to alter the concentration values. There are two groups of offset values, which are used selectively according to the decision result output from the pixel state calculator 210.

The offsets $$\begin{Bmatrix} Ofst11\_*, & Ofst12\_*, & Ofst13\_*, \\ Ofst21\_*, & Ofst22\_*, & Ofst23\_*, \\ Ofst31\_*, & Ofst32\_*, & Ofst33\_* \end{Bmatrix}$$

(where the asterisk (*) represents '0' or '1') are added to the respective concentration values $$\begin{Bmatrix} Cn11, & Cn12, & Cn13, \\ Cn21, & Cn22, & Cn23, \\ Cn31, & Cn32, & Cn33 \end{Bmatrix}$$

obtained by the concentration calculator 130, and the resulting concentration values (Cnb) are output from the concentration modifier 220 as the modified concentration values 221 of the pixels. The offsets in FIG. 18A (*='0') are used when the decision result 211 is '0'; the offsets in FIG. 18B (*='1') are used when the decision result 211 is '1'.

As a specific example, the offset values Ofstvh_0 (v=1, 2, 3, h=1, 2, 3) may all be zero (0) as shown in FIG. 19A. The offset values Ofstvh_1 may be relatively small (e.g., 0) for the pixel of interest and its four diagonally adjacent pixels, but relatively large (e.g., 128 or 64) for the other neighboring pixels. In this case, if the coordinates of the pixel of interest are (x, y), then when the state decision is '1', the offset used for the pixel at position (x−a, y−b) is relatively large if the sum of a and b (a+b) is odd, and relatively small if a+b is even. Equivalently, the offset added to Cnvh is relatively large if the sum v+h is odd and relatively small if v+h is even.

As a result of the above processing, if the decision rule in FIG. 17 and the offsets in FIGS. 19A and 19B are used, when the original pixel values of all the pixels in the three-by-three array are close to the central value (128), the modified concentration values Cnb of the pixels horizontally and vertically adjacent to the pixel of interest rise, while the concentrations of the pixel of interest and its diagonally adjacent pixels are left unchanged. More generally, concentration values Cnvh are increased by relatively large amounts if v+h is odd, but are left substantially unchanged if v+h is even.

In FIG. 19B, the largest offset value (128) is applied only to the two pixels above and to the left to the pixel of interest. A smaller offset value (64) is applied to the two pixels below and to the right of the pixel of interest. Since the image data are processed in order from the top line to the bottom line and from left to right in each line, the largest offset is applied only to pixels that have already been processed as pixels of interest and will not have their pixel values reduced by further processing.

The alteration is made by addition of offset values in this embodiment, but multiplication may be used instead.

The ranking unit 140 receives the boosted concentration values 221 (Cnb) of the pixels from the concentration modifier 220, calculates rank values 141 (Rnk) for the pixels, and outputs the results. The rank values 141 (Rnk) are calculated in the same way as in the first embodiment.

The other elements in FIG. 15 are the same as in the first embodiment, so descriptions will be omitted.

The specific operation of the concentration calculator 130, ranking unit 140, pixel value distributor 150, pixel state calculator 210, and concentration modifier 220 in the second embodiment when the five-valued image data shown in FIG. 20A are output from the N-valued data generator 110 to the image buffer 120 will now be described with reference to FIGS. 19A, 19B, 20A, 20B, 21, and 22A to 22C. The pixel state calculator 210 will use the decision method (1) illustrated in FIGS. 16A and 16B with the specific values given in FIG. 21. The concentration modifier 220 will use the offset values shown in FIGS. 19A and 19B. The filter settings shown in FIG. 13B will be used for the concentration calculator 130. That is, the concentration calculator 130 has the following weighting coefficients:

$$\left\{\begin{matrix} 4, & 8, & 4, \\ 8, & 32, & 8, \\ 4, & 8, & 4 \end{matrix}\right\}$$

The operation when the pixel of interest is set at (1, 1) in the image data shown in FIG. 20A will be described.

The operation of the concentration calculator 130 will be described first. The concentration values of the pixels output from the concentration calculator 130 when the pixel of interest is at (1, 1) in FIG. 20A are the following.

$$\left\{\begin{matrix} Cn11 = 144, & Cn12 = 96, & Cn13 = 160, \\ Cn21 = 96, & Cn22 = 192, & Cn23 = 128, \\ Cn31 = 160, & Cn32 = 128, & Cn33 = 192 \end{matrix}\right\}$$

As an example, the calculation of concentration value Cn11 will be described. The center of the relevant three-by-three array of pixels is located at (0, 0), and the pixel values (Dt11 to Dt33) are the following.

$$\left\{\begin{matrix} - & - & - \\ - & 4 & 0 \\ - & 0 & 4 \end{matrix}\right\}$$

The dashes ('−') in this example denote nonexistent pixel data that are treated as zero because they apply to pixel positions outside the range of the image. These values are multiplied by the filter coefficients shown in FIG. 13B to obtain an array of values that sum to 144 (=128+16).

$$\left\{\begin{matrix} - & - & - \\ - & 4 & 0 \\ - & 0 & 4 \end{matrix}\right\} \times \left\{\begin{matrix} 4, & 8, & 4, \\ 8, & 32, & 8, \\ 4, & 8, & 4, \end{matrix}\right\} = \left\{\begin{matrix} 0 & 0 & 0 \\ 0 & 128 & 0 \\ 0 & 0 & 16 \end{matrix}\right\}$$

This sum (144) is the concentration value (Cn11) output by the concentration calculator 130.

In the exemplary parameters shown in FIG. 21 for the decision filter used by the pixel state calculator 210, each filter element is a triplet of values listed in the order 'Reverse', 'Lower', and 'Pix' as follows.

Ptn11={0, 0, 4}, Ptn12={0, 0, 0}, Ptn13={0, 0, 4},
Ptn21={0, 0, 0}, Ptn22={1, 1, 0}, Ptn23={1, 1, 0},
Ptn31={1, 1, 0}, Ptn32={1, 1, 0}, Ptn33={1, 1, 0}

These parameters test whether the first four input pixel values Dt11, Dt12, Dt13, Dt21 have values of 4, 0, 4, 0, respectively, returning decision results of '1' if they do and '0' if they do not. For the remaining input pixel values Dt22, Dt23, Dt31, Dt32, Dt33 these parameters test whether the input pixel value is equal to or greater than zero and accordingly always return decision results of '1'. When the pixel of interest is at (1, 1) in FIG. 20A, the input pixel values are as follows:

$$\left\{\begin{matrix} Dt11, & Dt12, & Dt13, \\ Dt21, & Dt22, & Dt23, \\ Dt31, & Dt32, & Dt33 \end{matrix}\right\} = \left\{\begin{matrix} 4 & 0 & 4 \\ 0 & 4 & 0 \\ 4 & 0 & 4 \end{matrix}\right\}$$

so the individual pixel decision results are $$\left\{\begin{matrix} 1 & 1 & 1 \\ 1 & 1 & 1 \\ 1 & 1 & 1 \end{matrix}\right\}$$

and accordingly the total state decision result output from the pixel state calculator 210 is one ('1').

Some specific examples of the decision process are as follows. The Lower flag of Ptn11 is zero (Lower='0'), so whether the Dt11 value is equal to the Pix value of Ptn11 is decided. Since both values are four (Dt11=Pix='4'), the first decision result is one ('1'), and since the Reverse flag is zero (Reverse='0'), the second decision result is the same as the first decision result, namely '1'.

The Lower flag of Ptn12 is zero (Lower='0'), so whether the Dt12 value is equal to the Pix value of Ptn12 is decided. Since both values are zero (Dt11=Pix='0'), the first decision result is one ('1'), and since the Reverse flag is zero (Reverse='0'), the second decision result is the same as the first decision result, again '1'.

Since the Lower flag of Ptn23 is one (Lower='1'), whether Dt23 is less than the Pix value of Ptn23 is decided. Dt23 and this Pix value are both zero (Dt23=Pix='0'), so Dt23 is not less than the Pix value and the first decision result is zero ('0'). Since the value of Reverse flag is one (Reverse='1'), the second decision result is the reverse of the first decision result, namely one ('1').

Ptn23 to Ptn33 all have the same parameter values (Lower='1', Reverse='1', Pix=0) as Ptn23, which ensure that the second decision result is always one ('1') regardless of the image data values Dt.

In summary, when the pixel of interest is a black pixel (of value '4'), the decision filter in FIG. 21 decides whether the pixel of interest and the four neighboring pixels above it or to its left form a black and white checkerboard pattern.

As noted above, when the filter elements shown in FIGS. 16A and 16B are used and the values of Reverse, Lower, and Pix are set as shown in FIG. 21, the second decision results for the pixels below and to the right of the pixel of interest are one ('1') regardless of their pixel values.

If the pixel of interest has coordinates (x, y) and the pixels above or to the left of the pixel of interest have coordinates (x−c, y−d), the second decision result is one ('1') if the sum of c and d (c+d) is even and the pixel at (x−c, y−d) has the maximum possible pixel value ('4') in the five-valued data. The second decision results for these pixels are also one ('1') if c+d is odd and the pixel at (x−c, y−d) has the minimum possible pixel value ('0') in the five-valued data.

The overall decision is therefore made essentially by testing three pixels in the line above the pixel of interest within the filtering range (decision range) and one pixel located to the left of the pixel of interest, at coordinates (x−c, y−d), where (x, y) is the position of the pixel of interest. If the pixel values of these four pixels are '4' when c+d is even and '0' when c+d is odd, the total state decision is '1', indicating a checkerboard pattern. Otherwise the total state decision is zero ('0').

The pixels located above or to the left of the pixel of interest have already been processed, so their state decision results are comparatively reliable. The pixels below and to the right of the pixel of interest have not yet been processed, so the decision filter arbitrarily assigns them state decision results of '1'.

In the above example, the decision is made by checking whether pixels at prescribed positions have the maximum possible pixel value and pixels at other positions have the minimum possible pixel value, so as to test for a checkerboard pattern. The decision parameters can be altered, however, to look for values other than the maximum and minimum values and patterns other than a checkerboard pattern.

The operation of the concentration modifier 220 will now be described. From FIGS. 19A and 19B it can be seen that the offset settings (offset group_0) used when the input decision result is zero are $$\left\{ \begin{array}{lll} \mathit{Ofst}11\_0 = 0, & \mathit{Ofst}12\_0 = 0, & \mathit{Ofst}13\_0 = 0, \\ \mathit{Ofst}21\_0 = 0, & \mathit{Ofst}22\_0 = 0, & \mathit{Ofst}23\_0 = 0, \\ \mathit{Ofst}31\_0 = 0, & \mathit{Ofst}32\_0 = 0, & \mathit{Ofst}33\_0 = 0 \end{array} \right\}$$

and the offset settings (offset group_1) used when the input decision result is one are $$\left\{ \begin{array}{lll} \mathit{Ofst}11\_1 = 0, & \mathit{Ofst}12\_1 = 128, & \mathit{Ofst}13\_1 = 0, \\ \mathit{Ofst}21\_1 = 128, & \mathit{Ofst}22\_1 = 0, & \mathit{Ofst}23\_1 = 64, \\ \mathit{Ofst}31\_1 = 0, & \mathit{Ofst}32\_1 = 64, & \mathit{Ofst}33\_1 = 0 \end{array} \right\}$$

When the pixel of interest is at (1, 1), the offsets in FIG. 19*b* (offset group_1) are used. When these offsets are added to the input concentration values Cn11, Cn12, Cn13, Cn21, Cn22, Cn23, Cn31, Cn32, and Cn33, the resulting modified or boosted concentration values (Cnb) output from the concentration modifier 220 are:

$$\left\{ \begin{array}{lll} Cnb11 = 144, & Cnb12 = 224, & Cnb13 = 160, \\ Cnb21 = 224, & Cnb22 = 192, & Cnb23 = 192, \\ Cnb31 = 160, & Cnb32 = 192, & Cnb33 = 192 \end{array} \right\}$$

For comparison, the concentration values before the alteration were:

$$\left\{ \begin{array}{lll} Cn11 = 144, & Cn12 = 96, & Cn13 = 160, \\ Cn21 = 96, & Cn22 = 192, & Cn23 = 128, \\ Cn31 = 160, & Cn32 = 128, & Cn33 = 192 \end{array} \right\}$$

When the coordinates of the pixel of interest are (x, y), addition of the above offset values to the concentration values of the pixels increases the intensity of pixels located at positions (x−a, y−b) satisfying the condition that the sum of a and b (a+b) is an odd number, resulting in a reduced numerical rank value (a higher rank) and, as a result, a higher priority for receiving a share of the pixel value of the pixel of interest. Consequently, the intensity of the pixels at (x−a, y−b) tends to increase when the condition that the sum of a and b (a+b) is odd is satisfied. This condition defines the position of a white pixel in the checkerboard pattern. There is therefore a tendency for the processing in this example to break up checkerboard patterns.

Next, the operation of the ranking unit 140 will be described. When the position of the pixel of interest is (1, 1) in FIG. 20A, the ranking unit 140 receives the modified concentration values given above from the concentration modifier 220, and outputs the following rank values.

$$\left\{ \begin{array}{lll} Rnk11 = 8, & Rnk12 = 1, & Rnk13 = 7, \\ Rnk21 = 0, & Rnk22 = 5, & Rnk23 = 4, \\ Rnk31 = 6, & Rnk32 = 3, & Rnk33 = 2 \end{array} \right\}$$

These rank values are input to the pixel value distributor 150, which distributes the pixel value of the pixel of interest to its higher-ranked neighboring pixels. Specifically, in the three-by-three array of pixels centered at (1, 1) in FIG. 20A, the entire value ('4') of the pixel of interest Dt22 is distributed to the non-saturated higher-ranking pixel Dt21 to its left, (the input value and rank of Dt21 are both '0'), resulting in the following updated pixel values Dtb11 to Dtb33.

$$\begin{cases} Dtb11 = 4, & Dtb12 = 0, & Dtb13 = 4, \\ Dtb21 = 4, & Dtb22 = 0, & Dtb23 = 0, \\ Dtb31 = 4, & Dtb32 = 0, & Dtb33 = 4 \end{cases}$$

For comparison, the pixel values before distribution are shown below.

$$\begin{cases} Dt11 = 4, & Dt12 = 0, & Dt13 = 4, \\ Dt21 = 0, & Dt22 = 4, & Dt23 = 0, \\ Dt31 = 4, & Dt32 = 0, & Dt33 = 4 \end{cases}$$

The calculated pixel values of the pixel of interest and its eight neighboring pixels in the three-by-three array update the pixel values of pixels at the following positions in the image data stored in the image buffer 120.

$$\begin{cases} (0, 0), & (1, 0), & (2, 0), \\ (0, 1), & (1, 1), & (2, 1), \\ (0, 2), & (1, 2), & (2, 2) \end{cases}$$

The updated data values are shown in FIG. 20B. A comparison of FIGS. 20A and 20B shows that the checkerboard pattern has been broken up in the upper left corner.

After the completion of the above processing on the current pixel of interest, the processing proceeds to the next pixel of interest, which in this case is the right adjacent pixel at (2, 1). The image buffer 120 supplies the concentration calculator 130 with the pixel values 122 of the five-by-five array of pixels centered on the next pixel of interest, and sends the pixel values 123 of the central three-by-three array of pixels to the pixel value distributor 150 and pixel state calculator 210. Pixel state decisions, calculations of concentration values and rank values, and a pixel value redistribution are then carried out on the new three-by-three array of pixels.

This process is iterated until the last pixel in the image data, located at (7, 4) in FIG. 20A, has been processed as the pixel of interest. FIG. 22A shows the resulting image data. These image data are converted by the pixel value distributor 150 from five-valued pixel data with 1200×1200 dpi resolution to the 2400×2400 dpi dot pattern in FIG. 22B.

FIG. 22C shows the 2400×2400 dpi dot pattern obtained when the processing by the pixel state calculator 210 and concentration modifier 220 is not carried out, i.e., when the processing in the first embodiment is carried out. For consistency, the row and column coordinate values in FIGS. 20B and 20C are the same as the coordinate values used for 1200× 1200 dpi resolution in FIG. 22A.

A comparison of FIGS. 22A and 22B with FIG. 22C shows that the second embodiment breaks up the checkerboard pattern substantially throughout the image, while the first embodiment leaves the checkerboard pattern intact. The pixel state calculator 210 and concentration modifier 220 have the effect of changing a checkerboard pattern into a pattern with the same tone density but larger contiguous black areas.

High-resolution checkerboard patterns are difficult for electrophotographic printers to reproduce accurately. The problem is that toner is also transferred to white pixels in the pattern, thereby darkening the reproduced tone, up to a twice the intended darkness. By converting the checkerboard pattern to a different pattern, the second embodiment can avoid this excess toner transfer, thereby enabling reproduction of a tone better approximating the original tone.

In the example shown in the second embodiment, the decision filter in the pixel state calculator 210 and the offset alterations in the pixel state calculator 210 were set with the specific intention of suppressing checkerboard patterns, but the occurrence of other types of patterns that would prevent faithful tone reproduction can also be avoided by using a suitable combination of settings of the pixel state calculator 210 and concentration modifier 220.

The flag values and other parameter values of the decision filter shown in FIG. 21 are only one of many possible examples, and should be changed as necessary to deal with other patterns. Such changes in the parameter or flag values of the decision filter provide a flexible and simple way to overcome reproduction problems associated with various patterns.

Third Embodiment

Figure 23:
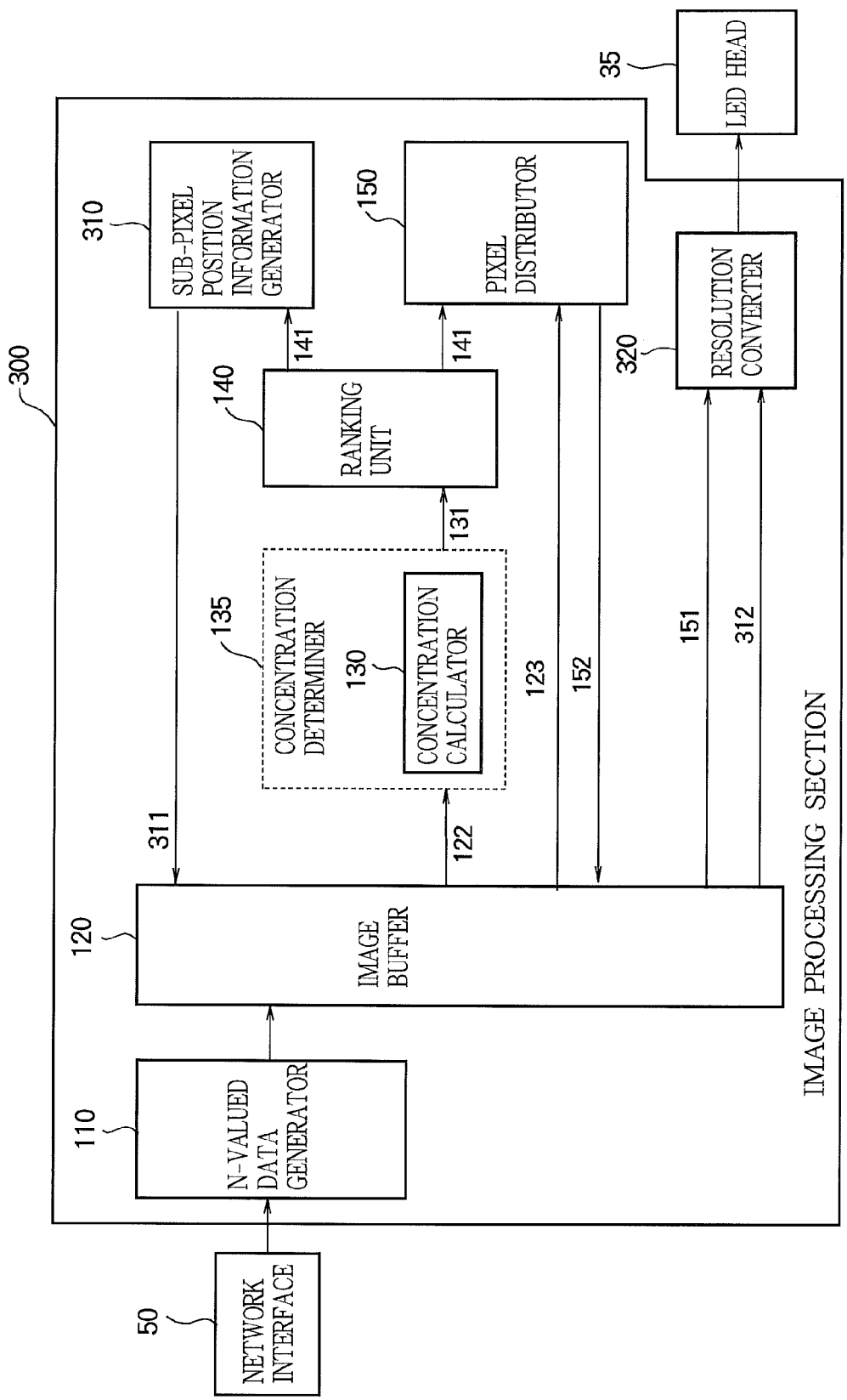
FIG. 23 is a block diagram of the image processing section, network interface, and LED head in a third embodiment of the invention.

Referring to FIG. 23, the third embodiment is an image forming apparatus that includes the same LED head 35 and network interface 50 as in the first and second embodiments, but has a modified image processing section 300. The image processing section 300 differs from the image processing section 100 shown in FIG. 2 in the first embodiment in that a sub-pixel position information generator 310 is added and the resolution converter 160 is replaced with a different resolution converter 320.

The sub-pixel position information generator 310 uses the pixel ranks (Rnk) determined by the ranking unit 140 to generate sub-pixel positional information 311. The resolution converter 320 uses the sub-pixel positional information generated by the sub-pixel position information generator 310 to convert the N-valued image data to higher-resolution binary image data.

The higher-resolution binary image data are configured as a two-by-two matrix array of four-bit data (sub-pixel data) for each of the N-valued data. The sub-pixel positional information includes starting point information 313 indicating which of the four sub-pixel bits will be the first to be set to '1' and growing direction information 314 indicating a direction from the starting point, and may further include a diagonal growing flag 315 indicating whether the pixel located diagonally opposite the starting point has the second highest rank.

The same pixel rank values 141 (Rnk) are input to both the sub-pixel position information generator 310 and the pixel value distributor 150.

The generated sub-pixel positional information 311 is stored temporarily in the image buffer 120 and supplied as output sub-pixel positional information 312 to the resolution converter 320 in synchronization with the output of the finalized pixel data 151. The output of the resolution converter 320 is sent to the LED head 35.

Figure 24:
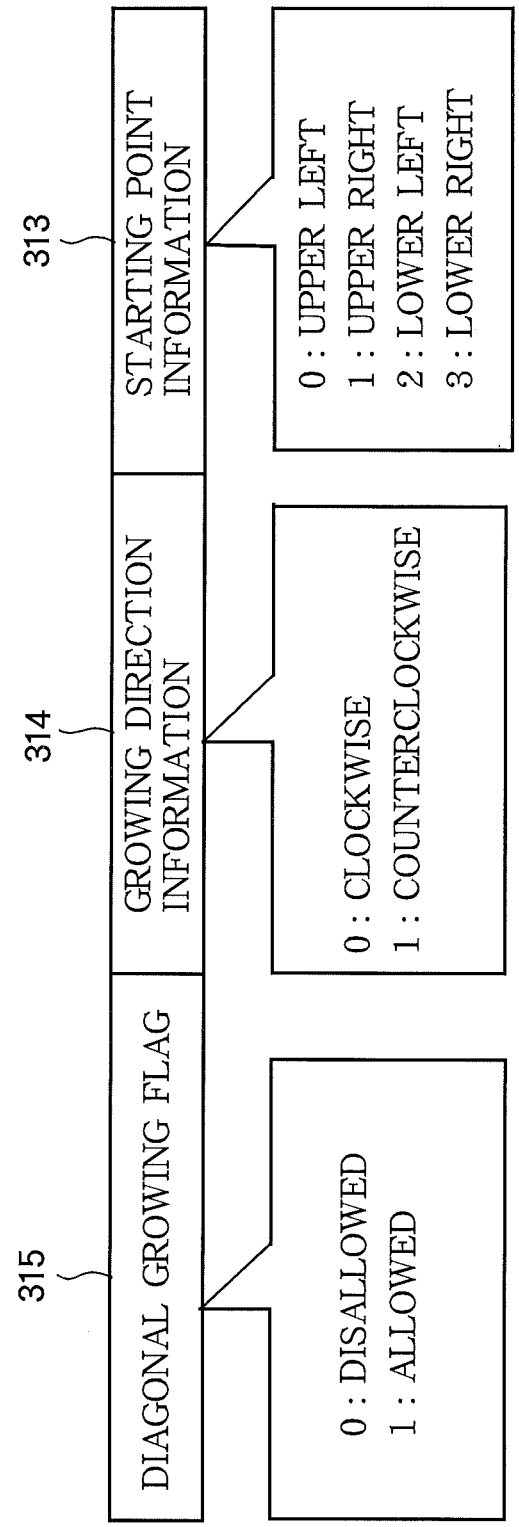
FIG. 24 shows an example of the structure of the sub-pixel position information generated in the third embodiment.

The sub-pixel position information generator 310 generates sub-pixel positional information 311 for each pixel when it is the pixel of interest, using the rank values 141 of the pixels in the three-by-three array of pixels centered on the pixel. FIG. 24 shows an example of sub-pixel positional information 311 including the starting point information 313, growing direction information 314, and diagonal growing flag 315 mentioned above.

The starting point information 313 indicates the position of the sub-pixel with the highest priority for having its bit value set to '1'; the growing direction information 314 is a one-bit flag indicating the direction in which the sub-pixel with the next highest priority for having its bit value set to '1' is located with respect to the starting point. In this example, if the sub-pixel with the second highest priority is located at the next position in the clockwise direction, the growing direction information 314 is set to '0'; if the sub-pixel with the second highest priority is located at the next position in the counterclockwise direction, the growing direction information 314 is set to '1'.

The diagonal growing flag 315 indicates whether there is a possibility of diagonal growth: if diagonal growth is allowed, the diagonal growing flag 315 is set to '1'; otherwise, the diagonal growing flag 315 is set to '0'.

Each item of the above information is determined by the position of the pixel with the smallest numerical rank value (highest rank) among the rank values Rnk11, Rnk12, Rnk13, Rnk21, Rnk23, Rnk31, Rnk32, and Rnk33 other than the rank value Rnk22 of the pixel of interest, the result of a comparison between the smallest rank value and the rank value of the pixels adjacent to the pixel with the smallest rank value, and the position of the pixel with the second smallest rank value (second highest rank).

How the information described above is determined will now be described for eight cases, depending on which of the eight neighboring pixels is highest ranked (has the numerically smallest rank value).

When Rnk11 is the numerically smallest rank value, the starting point information is set to '0'. The growing direction information is set to '0' if Rnk12 is less than Rnk21 (Rnk12<Rnk21) and to '1' if Rnk12 is greater than Rnk21 (Rnk12>Rnk21). The diagonal growing flag is set to '1' if the rank Rnk33 in the position diagonally opposite Rnk11 has the second smallest numerical value, and to '0' otherwise.

When Rnk12 is the numerically smallest rank value, the starting point information and the growing direction information are both set to '0' if Rnk11 is less than Rnk13 (Rnk11<Rnk13) and to '1' if Rnk11 is greater than Rnk13 (Rnk11>Rnk13). The diagonal growing flag is set to '0'.

When Rnk13 is the numerically smallest rank value, the starting point information is set to '1'. The growing direction information is set to '1' if Rnk12 is less than Rnk23 (Rnk12<Rnk23) and to '0' if Rnk12 is greater than Rnk23 (Rnk12>Rnk23). The diagonal growing flag is set to '1' if the rank Rnk31 in the position diagonally opposite Rnk13 has the second smallest numerical value, and to '0' otherwise.

When Rnk21 is the numerically smallest rank value, the starting point information is set to '0' if Rnk11 is less than Rnk31 (Rnk11<Rnk31) and to '2' if Rnk11 is greater than Rnk31 (Rnk11>Rnk31). The growing direction information is set to '1' if Rnk11 is less than Rnk31 and to '0' if Rnk11 is greater than Rnk31. The diagonal growing flag is set to '0'.

When Rnk23 is the numerically smallest rank value, the starting point information is set to '1' if Rnk13 is less than Rnk33 (Rnk13<Rnk33) and to '3' if Rnk13 is greater than Rnk33 (Rnk13>Rnk33). The growing direction information is set to '0' if Rnk13 is less than Rnk33 and to '1' if Rnk13 is greater than Rnk33. The diagonal growing flag is set to '0'.

When Rnk31 is the numerically smallest rank value, the starting point information is set to '2'. The growing direction information is set to '0' if Rnk21 is less than Rnk32 (Rnk21<Rnk32) and to '1' if Rnk12 is greater than Rnk21 (Rnk21>Rnk32). The diagonal growing flag is set to '1' if the rank Rnk13 in the position diagonally opposite Rnk31 has the second smallest numerical value, and to '0' otherwise.

When Rnk32 is the numerically smallest rank value, the starting point information is set to '2' if Rnk31 is less than Rnk33 (Rnk31<Rnk33) and to '3' if Rnk31 is greater than Rnk33 (Rnk31>Rnk33). The growing direction information is set to '1' if Rnk31 is less than Rnk33 and to '0' if Rnk31 is greater than Rnk33. The diagonal growing flag is set to '0'.

When Rnk33 is the numerically smallest rank value, the starting point information is set to '3'. The growing direction information is set to '1' if Rnk23 is less than Rnk32 (Rnk23<Rnk32) and to '0' if Rnk23 is greater than Rnk32 (Rnk23>Rnk32). The diagonal growing flag is set to '1' if the rank Rnk11 in the position diagonally opposite Rnk33 has the second smallest numerical value, and to '0' otherwise.

The starting point accordingly lies in the general direction of the highest-ranked pixel other than the pixel of interest. When this highest-ranked pixel is diagonally adjacent to the pixel of interest, this condition alone determines the starting point. When this highest-ranked pixel is horizontally or vertically adjacent to the pixel of interest, the two pixels adjacent to this highest-ranked pixel are compared to determine the starting point.

The growing direction is determined by comparing the two adjacent pixels next to the highest-ranked pixel other than the pixel of interest. The growing direction is the direction of the higher-ranked one of these two pixels.

The diagonal growing flag is set (to '1') when the two highest ranked pixels other than the pixel of interest are located in diagonally opposite corners of the three-by-three array.

The sub-pixel positional information 311 generated and output in this way is held temporally in the image buffer 120, and input as output sub-pixel positional information 312 in synchronization with the output of the pixel data 151 to the resolution converter 320.

The resolution converter 320 receives the pixel data 151 and sub-pixel positional information 312 supplied from the image buffer 120, and uses the sub-pixel positional information 312 to convert the pixel values in the pixel data 151 to bit patterns for control of the light-emitting elements (LEDs) of the LED head 35. The resolution converter 320 then converts these bit patterns to lines of consecutive bit data oriented in the horizontal direction (the main scanning direction on the page), and sends to the resulting bit data to the LED head 35.

Exemplary bit pattern conversions carried out by the resolution converter 320 are shown in FIG. 25. In the examples shown, five-valued (N=5) image data with 1200×1200 dpi resolution are converted to 2400×2400 dpi bit patterns. The values '0' to '4' in the pixel data column in FIG. 10 are the input 1200×1200 dpi pixel values. The values '0' and '1' in the squares of the matrices shown in the bit pattern column denote 2400×2400 dpi pixel values, referred to below as sub-pixel values. The diagonal growing flag is not used; diagonal growth is not allowed.

Taking the pixel values in each matrix in the sequence of upper left, upper right, lower left, and lower right, an input '0' is converted to the bit pattern '0000'. An input '1' is converted to bit patterns as follows according to the value of the starting point information: '1000' if the starting point information is '0'; '0100' if the starting point information is '1'; '0010' if the starting point information is '2'; '0001' if the starting point information is '3'. In these bit patterns, only the sub-pixel at the starting point is illuminated. The rendering of the 1200×1200 dpi pixel is thereby biased toward the highest-ranked adjacent pixel.

An input '2' is converted to the following bit patterns according to the values of the starting point information and growing direction information: '1100' if the starting point information is '0' and the growing direction information is '0'; '1010' if the starting point information is '0' and the growing direction information is '1'; '0101' if the starting point information is '1' and the growing direction information is '0'; '1100' if the starting point information is '1' and the growing direction information is '1'; '1010' if the starting point information is '2' and the growing direction information is '0'; '0011' if the starting point information is '2' and the growing direction information is '1'; '0011' if the starting point information is '3' and the growing direction information is '0'; '0101' if the starting point information is '3' and the growing direction information is '1'.

In this case, the sub-pixel at the starting point and the adjacent sub-pixel in the growing direction are illuminated. The rendering of the 1200×1200 dpi pixel is thereby biased toward the highest-ranked neighboring 1200×1200 dpi pixel and the next highest-ranked pixel adjacent to it.

An input '3' is converted to bit patterns as follows according to the value of the starting point information: '1110' if the starting point information is '0'; '1101' if the starting point information is '1'; '1011' if the starting point information is '2'; '0111' if the starting point information is '3'. The rendering of the 1200×1200 dpi pixel is again biased toward the highest-ranked neighboring 1200×1200 dpi pixel, this time by illuminating the sub-pixel at the starting position and its two adjacent sub-pixels.

An input '4' is converted to the bit pattern '1111'. All four sub-pixels are illuminated.

Conversions of these four pixel values to the consecutive bit patterns in the horizontal (main scanning) direction are carried out as shown in FIGS. 11A and 11B above. FIG. 11A shows the 2400×2400 dpi bit patterns '0000', '1000', '1100', '1110', '1111', . . . in FIG. 25 placed side by side. In FIG. 11B, the first line in FIG. 11A is converted to a horizontal line of bit data with bit values '0010111111 . . . ', and the next line in FIG. 11A is converted to a horizontal line of bit data with bit values '0000001011 . . . '. These lines of converted bit data are sent to the LED head 35.

When a bit in a horizontal line of bit data is '1', the LED head 35 turns on the light emitting element located at the corresponding position, forming an electrostatic dot on the photosensitive drum. The image forming process described earlier creates a toner image (FIG. 11C) corresponding to the bit pattern on paper or other media.

In the example shown in FIG. 25 five-valued image data (N=5) with 1200×1200 dpi resolution are converted to bit patterns with 2400×2400 dpi resolution without the use of the diagonal flag, but this is not a limitation. Conversions between other resolutions are possible, and the diagonal flag may be used.

The other components in FIG. 23 are the same as in the first embodiment, so descriptions will be omitted.

Specific examples of the operation of the concentration calculator 130, ranking unit 140, pixel value distributor 150, sub-pixel position information generator 310, and resolution converter 320 will now be described with reference to FIGS. 26A to 26D, 27A, and 27B. It will be assumed that the filter of the concentration calculator 130 uses the weights shown in FIG. 13B (filter setting 2).

First, the operation of the concentration calculator 130, ranking unit 140, pixel value distributor 150, and sub-pixel position information generator 310 will be described using the exemplary image data shown in FIG. 26A. The first pixel of interest is located at (2, 0).

The concentration values output from the concentration calculator 130 for this pixel of interest are as follows.
Cn11=8, Cn12=28, Cn13=32,
Cn21=52, Cn22=124, Cn23=152,
Cn31=160, Cn32=172, Cn33=200

As an example, the calculation of Cn22 will be described. The center of the three-by-three array of pixels used in calculating Cn22 is located at (2, 0), and the pixel values Dt11 to Dt33 are the following.

$$\left\{\begin{array}{ccc} - & - & - \\ 0 & 2 & 3 \\ 2 & 2 & 3 \end{array}\right\}$$

The dashes ('-') in this example again denote nonexistent pixel data that are treated as zero (0). These values are multiplied by the filter coefficients shown in FIG. 13B to obtain an array of values that sum to 124 (=64+24+8+16+12).

$$\left\{\begin{array}{ccc} - & - & - \\ 0 & 2 & 3 \\ 2 & 2 & 3 \end{array}\right\} \times \left\{\begin{array}{ccc} 4, & 8, & 4, \\ 8, & 32, & 8, \\ 4, & 8, & 4 \end{array}\right\} = \left\{\begin{array}{ccc} 0 & 0 & 0 \\ 0 & 64 & 24 \\ 8 & 16 & 12 \end{array}\right\}$$

This sum (124) is the concentration value (Cn22) output by the concentration calculator 130.

Next, the operation of the ranking unit 140 will be described. The ranking unit 140 receives the above concentration values of the pixels calculated by the concentration calculator 130 and outputs the following rank values to the pixel value distributor 150.

$$\left\{\begin{array}{lll} Rnk11 = 8, & Rnk12 = 7, & Rnk13 = 6, \\ Rnk21 = 5, & Rnk22 = 4, & Rnk23 = 3, \\ Rnk31 = 2, & Rnk32 = 1, & Rnk33 = 0 \end{array}\right\}$$

When receiving these rank values, the pixel value distributor 150 distributes the pixel value of the pixel of interest to its higher-ranked neighboring pixels. In the three-by-three array of pixels centered on the pixel of interest at (2, 0) in FIG. 26A, the value of the pixel of interest Dt22 is '2'. Half of this value is distributed to the highest-ranked neighboring pixel Dt33, saturating that pixel, and the remaining half is distributed to the next highest-ranked neighboring pixel Dt32. The updated pixel values Dtb11 to Dtb33 are as follows.

$$\left\{\begin{array}{lll} Dtb11 = 0, & Dtb12 = 0, & Dtb13 = 0, \\ Dtb21 = 0, & Dtb22 = 0 & Dtb23 = 3, \\ Dtb31 = 2, & Dtb32 = 3, & Dtb33 = 4 \end{array}\right\}$$

Among the pixel data calculated above, Dtb11, Dtb12, and Dtb13 are ignored because their corresponding positions (1, −1), (2, −1), and (3, −1) are outside the area of the image data. The pixel values of the remaining pixels, at the following positions, are updated as shown in FIG. 26B.

$$\left\{\begin{array}{lll} (1, 0), & (2, 0), & (3, 0), \\ (1, 1), & (2, 1), & (3, 1) \end{array}\right\}$$

After the completion of the above processing on the current pixel of interest, the processing proceeds to the next pixel of interest, which in the current example is located at (3, 0). The image buffer 120 supplies the concentration calculator 130 with the pixel values 122 of the five-by-five array of pixels centered on the next pixel of interest and sends the pixel values 123 of the central three-by-three array to the pixel value distributor 150. Concentration values and rank values are calculated for the new three-by-three array of pixels, followed by pixel value redistribution.

Next, the operation of the sub-pixel position information generator 310 will be described. The sub-pixel position information generator 310 receives the rank values of the pixels obtained by the ranking unit 140 and generates sub-pixel positional information 311 for the pixel of interest, including starting point information '3', growing direction information '0', and a diagonal growing flag '0' for the case where the pixel of interest is at (2, 0). The sub-pixel position information generator 310 sends the sub-pixel positional information 311 to the image buffer 120, in which it is held temporarily.

The above processing is iterated until the pixel at the final position (7, 4) of the image data has been processed as the pixel of interest. FIG. 26C shows the resulting image. FIG. 26D shows the corresponding sub-pixel positional information. At each pixel position in FIG. 26D, the first numerical value is the value of the diagonal growing flag, the next numerical value is the growing direction information, and the third numerical value is the starting point information.

The operation of the resolution converter 320 will now be described. An exemplary conversion carried out for the pixel at (5, 0) in FIG. 26C using the sub-pixel positional information shown in FIG. 26D will be described.

In this example, the pixel data 151 and the sub-pixel positional information 312 input to the resolution converter 320 are '1' and '2', respectively. Accordingly, as shown in FIG. 25, the five-valued 1200×1200 dpi pixel data value '1' is converted to the 2400×2400 dpi bit pattern '0010'. The growing direction information '1' and diagonal growing flag '0' are not taken into consideration because the pixel data value is '1'.

Figure 27A:
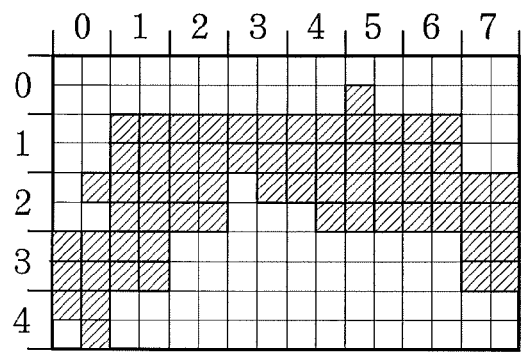
FIG. 27A shows the dot pattern obtained by processing the image data in FIG. 26A according to the third embodiment.

The above processing by the resolution converter 320 is iterated until the pixel at the final position (7, 4) of the image data in FIGS. 26A to 26D has been processed as the pixel of interest. The resulting 2400×2400 dpi bit pattern is shown in FIG. 27A.

Figure 27B:
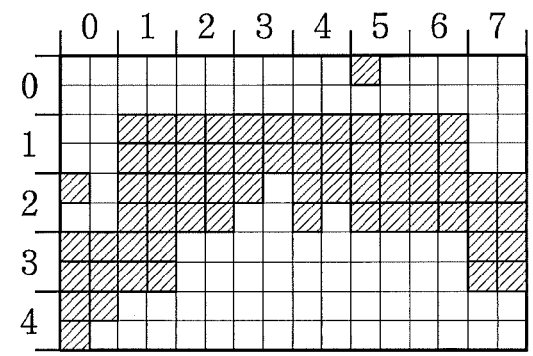
FIG. 27B shows the dot pattern obtained by processing the image data in FIG. 26A according to the first embodiment.

FIG. 27B shows the 2400×2400 dpi bit pattern created when the processing by sub-pixel the position information generator 310 and resolution converter 320 is not carried out (the processing in the first embodiment is carried out).

The bit pattern (FIG. 27B) formed in the first embodiment includes a pair of isolated black pixels. In contrast, the bit pattern (FIG. 27A) formed in the third embodiment includes no isolated black pixels. This is because the third embodiment determines the binary bit pattern by taking the starting point, growing direction, and other information into consideration.

As described above, the sub-pixel position information generator 310 and resolution converter 320 help eliminate occurrences of single discrete pixels that are seen in the conversion of tone scale image data to binary pixel data with a higher resolution. Accordingly, even when isolated black pixels cannot be reproduced faithfully due to characteristics of the image forming apparatus, by eliminating occurrences of isolated black pixels, the sub-pixel position information generator 310 and resolution converter 320 enable tones closer to the original tones to be reproduced.

In a variation of the third embodiment, the concentration determiner 135 described in the second embodiment is used instead of the concentration determiner 135 in FIG. 23.

Fourth Embodiment

Figure 28:
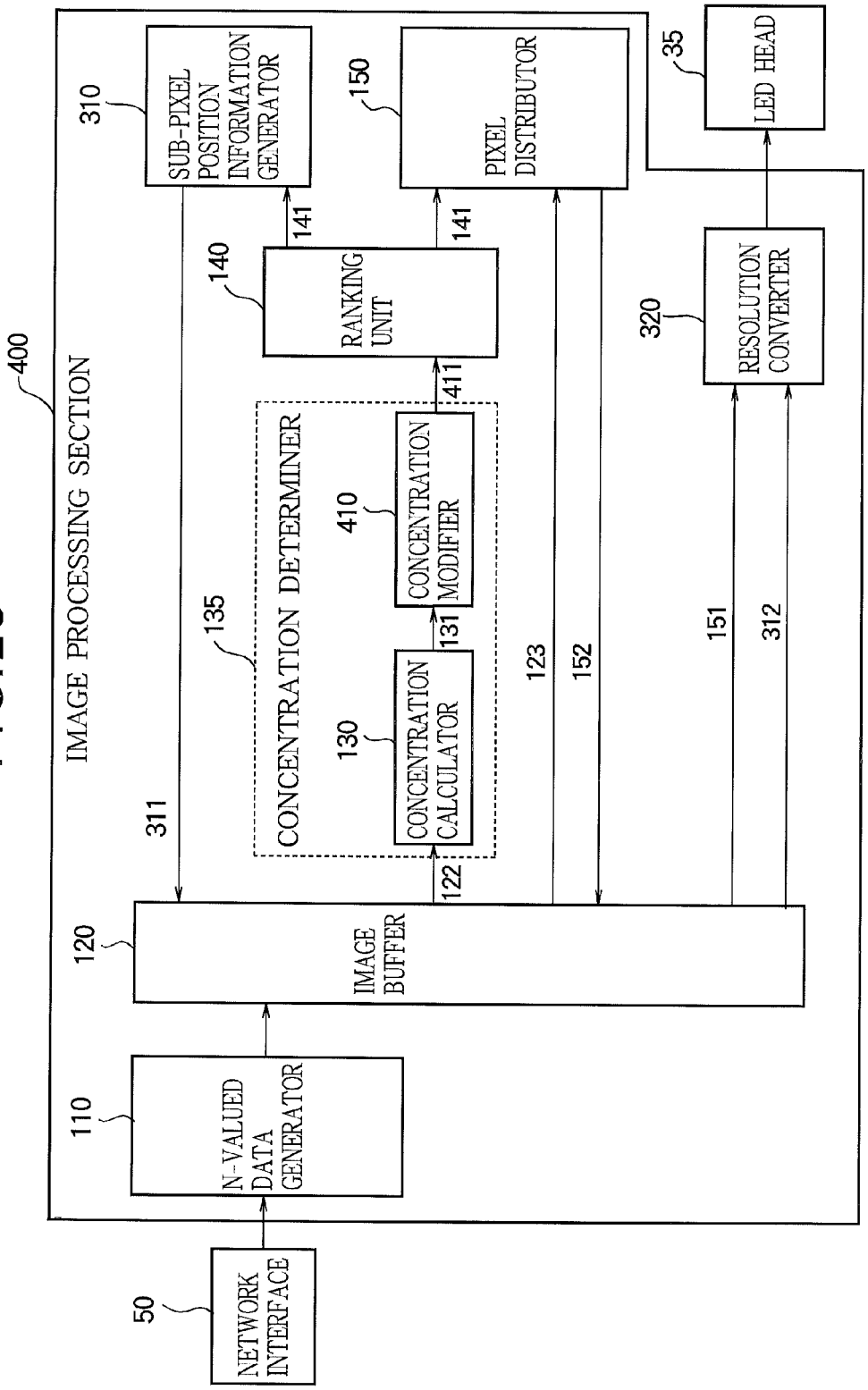
FIG. 28 is a block diagram of the image processing section, network interface, and LED head in a fourth embodiment of the invention.

Referring to FIG. 28, the fourth embodiment is an image forming apparatus that includes the same LED head 35 and network interface 50 as in the first to third embodiments, but has a modified image processing section 400. The image processing section 400 differs from the image processing section 300 shown in FIG. 23 in the third embodiment in that the concentration determiner 135 includes a concentration modifier 410 in addition to the concentration calculator 130.

The concentration modifier 410 alters the concentration values 131 (Cn) obtained by the concentration calculator 130 and outputs the modified concentration values 411. The alterations are carried out by using different groups of offsets according to the position of the pixel of interest. The groups of offsets may be constructed so as to produce a screen pattern.

The concentration values 131 (Cn) output from the concentration calculator 130 are input to the concentration modifier 410. The modified concentration values 411 (Cnb) output from the concentration modifier 410 are input to the ranking unit 140.

Figure 29:
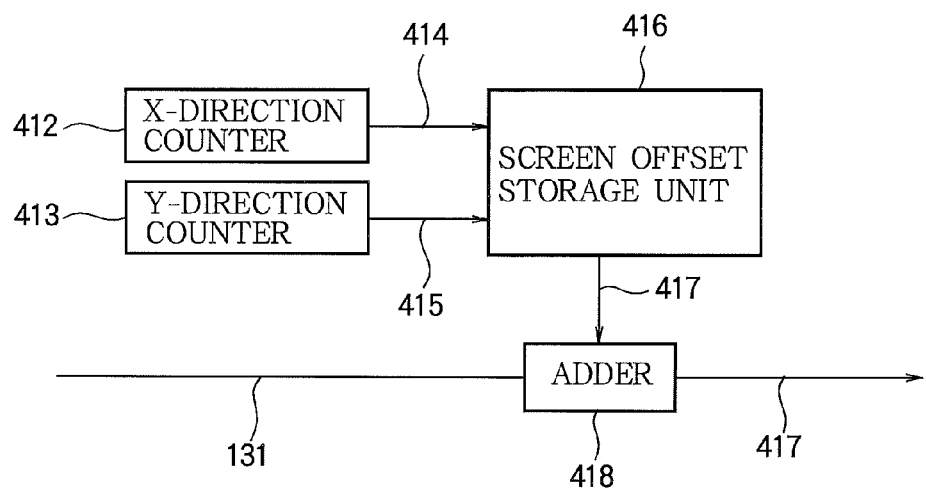
FIG. 29 is an exemplary block diagram of the concentration modifier in FIG. 28.

FIG. 29 shows an exemplary schematic block structure of the concentration modifier 410. The concentration modifier 410 shown includes an x-direction counter 412, a y-direction counter 413, a screen offset storage unit 416, and an adder 418.

Figure 30:
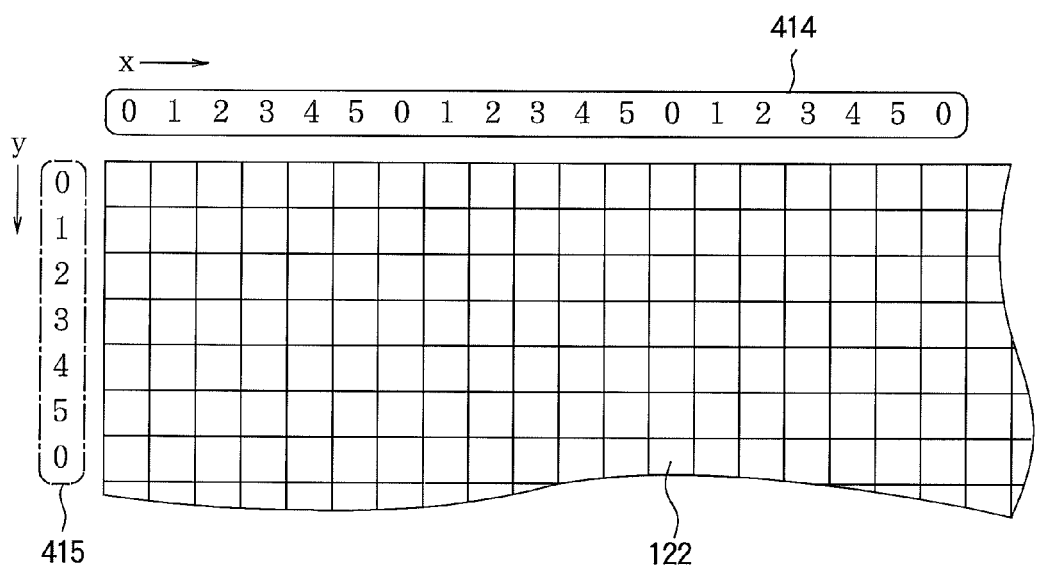
FIG. 30 illustrates count values used in the concentration modifier in FIG. 28.

The x-direction counter 412 and y-direction counter 413 count pixel positions in the x- and y-directions and output an x-direction pixel position count 414 and y-direction pixel position count 415, respectively. As shown in FIG. 30, the x- and y-direction pixel counts 414, 415 both take values from zero to five, returning from five to zero and repeating cyclically. The x- and y-direction pixel position counts are input to the screen offset storage unit 416.

Referring to FIG. 31, the screen offset storage unit 416 stores thirty-six groups of screen offsets corresponding to different combinations of the y-direction pixel position counts (0 to 5) and x-directional pixel position counts (0 to 5). The screen offsets corresponding to the x-direction pixel position count 414 and y-direction pixel position count 415 received from the counters 412, 413 are selected and output to the adder 418 as a group of screen offsets 417 (denoted Ofset).

Figures 32A, 32B:
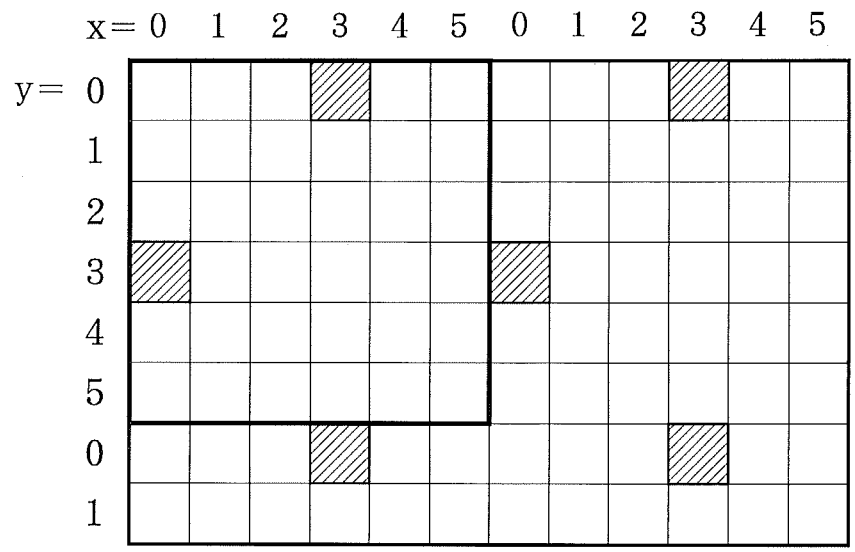
FIG. 32A schematically illustrates an exemplary screen structure and indicates a six-by-six-pixel unit region.
FIG. 32B shows exemplary offsets in the six-by-six-pixel unit region in FIG. 32A.

The screen offsets shown in FIG. 31 are constructed to produce an image with a diagonally checkered screen pattern with intersection points at (3, 0), (0, 3), (0+6n, 3+6n), and (3+6n, 0+6n) (where n is a positive integer), as indicated by hatching in FIG. 32A. The maximum offset values (60 in the example shown) occur at these intersection points. The offset values at pixel positions on the diagonal lines connecting the intersection points have the second highest value (45 in this example). The offset values decrease (to 40 and 20 in this example) with increasing distance from the diagonal lines, becoming zero at positions farthest from the diagonal lines.

The screen structure consists of an iterated six-by-six-pixel unit region, indicated by the heavy line in FIG. 32A. The screen offset storage unit 416 need only store offsets for this unit region, covering x-direction pixel positions and y-direction pixel positions from '0' to '5'.

The offsets read from each row in the table in FIG. 31 correspond to the offsets in a three-by-three window in FIG. 32B. For example, the nine offsets read from the row corresponding to an x-direction position count of one and a y-direction position count of one (x=1, y=1) have the values in the window Wnd in the top left part of FIG. 31.

$$\begin{Bmatrix} Ofset11 = 0, & Ofset12 = 20, & Ofset13 = 40, \\ Ofset21 = 20, & Ofset22 = 28, & Ofset23 = 45, \\ Ofset31 = 40, & Ofset32 = 45, & Ofset33 = 28 \end{Bmatrix}$$

These offsets are read and output to the adder 418 whenever the pixel of interest is in a position having x- and y-direction position counts of one ('1').

The screen offsets input to the adder 418 are added to the concentration values 131 (Cn) of the pixel of interest and its eight neighboring pixels as obtained in the concentration calculator 130, and the results are output to the ranking unit 140 as modified concentration values 411 (Cnb).

The other components are the same as in the third embodiment, so descriptions will be omitted.

Figure 33:
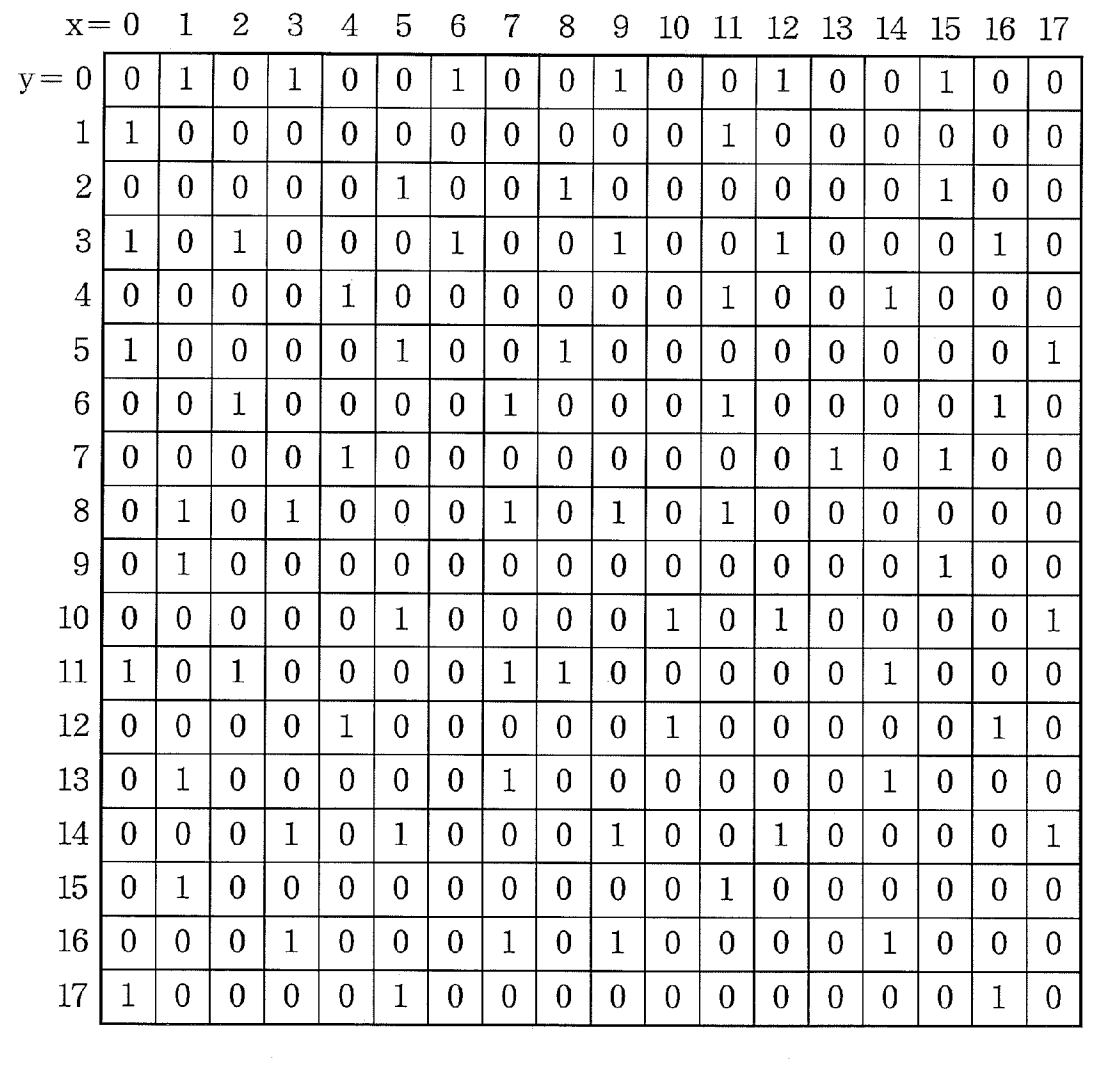

The specific operation of the concentration calculator 130, ranking unit 140, pixel value distributor 150, sub-pixel position information generator 310, resolution converter 320, and concentration modifier 410 in the fourth embodiment when the five-valued image data shown in FIG. 33 are output from the N-valued data generator 110 to the image buffer 120 will now be described with reference to FIGS. 32A, 32B, 33, and 34.

In FIG. 33, the coordinates of the pixel at the top left corner are (0, 0) and the coordinates of the pixel at the bottom right corner are (17, 17). The exemplary five-valued image data input from the N-valued data generator 110 all have values of '0' or '1'. The concentration calculator 130 is assumed to use the weights shown in FIG. 13B (filter setting 2). The operation when the pixel of interest is at position (1, 0) in FIG. 33 will be described below.

The concentration calculator 130 outputs the following concentration values (Cn) when the pixel of interest is at (1, 0) in FIG. 33.

$$\left\{\begin{array}{lll} Cn11 = 4, & Cn12 = 8, & Cn13 = 8, \\ Cn21 = 16, & Cn22 = 36, & Cn23 = 16, \\ Cn31 = 36, & Cn32 = 16, & Cn33 = 8 \end{array}\right\}$$

As an example, the calculation of Cn22 will be described. The relevant three-by-three array of pixels is centered at (1, 0) and has the following pixel values, the dashes ('-') denoting nonexistent pixel data that are treated as zero (0).

$$\left\{\begin{array}{ccc} - & - & - \\ 0 & 1 & 0 \\ 1 & 0 & 0 \end{array}\right\}$$

These values are multiplied by the weights shown in FIG. 13B to obtain an array of values summing to thirty-six (32+4=36).

$$\left\{\begin{array}{ccc} - & - & - \\ 0 & 1 & 0 \\ 1 & 0 & 0 \end{array}\right\} \times \left\{\begin{array}{ccc} 4, & 8, & 4, \\ 8, & 32, & 8, \\ 4, & 8, & 4 \end{array}\right\} = \left\{\begin{array}{ccc} 0 & 0 & 0 \\ 0 & 32 & 0 \\ 4 & 0 & 0 \end{array}\right\}$$

The calculation of Cn11 will now be described. The relevant three-by-three array of pixels is centered at (0, −1) and has the following pixel values.

$$\left\{\begin{array}{ccc} - & - & - \\ - & - & - \\ - & 0 & 1 \end{array}\right\}$$

These values are multiplied by the weights in FIG. 13B to obtain an array of values summing to four (0+4=4).

$$\left\{\begin{array}{ccc} - & - & - \\ - & - & - \\ - & 0 & 1 \end{array}\right\} \times \left\{\begin{array}{ccc} 4, & 8, & 4, \\ 8, & 32, & 8, \\ 4, & 8, & 4 \end{array}\right\} = \left\{\begin{array}{ccc} 0 & 0 & 0 \\ 0 & 0 & 0 \\ 0 & 0 & 4 \end{array}\right\}$$

The operation of the concentration modifier 410 will now be described. When the pixel of interest is at (1, 0) in FIG. 33, the following group of screen offsets, which corresponds to the x-directional pixel position '1' and y-directional pixel position '0', is selected from screen offsets shown in FIG. 31.

$$\left\{\begin{array}{lll} Ofset11 = 20, & Ofset12 = 28, & Ofset13 = 45, \\ Ofset21 = 0, & Ofset22 = 20, & Ofset23 = 40, \\ Ofset31 = 20, & Ofset32 = 28, & Ofset33 = 45 \end{array}\right\}$$

These offsets are added to the corresponding concentration values (Cn) calculated by the concentration calculator 130, which are:

$$\left\{\begin{array}{lll} Cn11 = 4, & Cn12 = 8, & Cn13 = 8, \\ Cn21 = 16, & Cn22 = 36, & Cn23 = 16, \\ Cn31 = 36, & Cn32 = 16, & Cn33 = 8 \end{array}\right\}$$

The resulting modified concentration values (Cnb) are:

$$\left\{\begin{array}{lll} Cnb11 = 24, & Cnb12 = 36, & Cnb13 = 53, \\ Cnb21 = 16, & Cnb22 = 56, & Cnb23 = 56, \\ Cnb31 = 56, & Cnb32 = 44, & Cnb33 = 53 \end{array}\right\}$$

The operation of the ranking unit 140 will now be described. When the pixel of interest is at (1, 0) in FIG. 33, the ranking unit 140 receives the above modified concentration values (Cnb) from the concentration modifier 410, and outputs the following rank values (Rnk).

$$\left\{\begin{array}{lll} Rnk11 = 7, & Rnk12 = 6, & Rnk13 = 4, \\ Rnk21 = 8, & Rnk22 = 2, & Rnk23 = 1, \\ Rnk31 = 0, & Rnk32 = 5, & Rnk33 = 3 \end{array}\right\}$$

These rank values are input to the pixel value distributor 150, which distributes the pixel value of the pixel of interest to higher-ranked neighboring pixels. The pixel values Dt11 to Dt33 centered on the pixel value Dt22 of the pixel of interest are updated by the distribution, resulting in the following pixel values Dtb11 to Dtb33 for the case where the pixel of interest is at (1, 0).

$$\left\{\begin{array}{lll} Dtb11 = 0, & Dtb12 = 0, & Dtb13 = 0, \\ Dtb21 = 0, & Dtb22 = 0, & Dtb23 = 0, \\ Dtb31 = 2, & Dtb32 = 0, & Dtb33 = 0 \end{array}\right\}$$

In the above pixel values, Dtb22 is the value at (1, 0). Dtb11, Dtb12, and Dtb13 are ignored because their positions (0, −1), (1, −1), and (2, −1) are outside the image data region. The remaining data are used for update of the pixel values at the following positions.

$$\begin{Bmatrix} (0,0), & (1,0), & (2,0), \\ (0,1), & (1,1), & (2,1) \end{Bmatrix}$$

In this example, the updated values are the following.

$$\begin{Bmatrix} Dtb21=0, & Dtb22=0, & Dtb23=0, \\ Dtb31=2, & Dtb32=0, & Dtb33=0 \end{Bmatrix}$$

After the completion of the above processing on the current pixel of interest, the processing proceeds to the next pixel of interest, which is the pixel at (2, 0) in the present example. The image buffer 120 supplies the concentration calculator 130 with the pixel values 122 of the five-by-five array of pixels centered on the next pixel of interest, and sends the pixel values 123 of the central three-by-three array to the pixel value distributor 150. Calculation of concentration values, modification of calculation values, calculation of rank values, and distribution of a pixel value are then carried out on the new three-by-three array of pixels.

When the pixel of interest is at (1, 0) in FIG. 33, the sub-pixel position information generator 310 uses the pixel ranks determined by the ranking unit 140 to generate sub-pixel positional information in which the starting point information 313 is set to '2', the growing direction information 314 is set to '1', and the diagonal growing flag 315 is set to '0'. This sub-pixel positional information 311 is sent to the image buffer 120, in which it is held temporarily.

Figure 34:
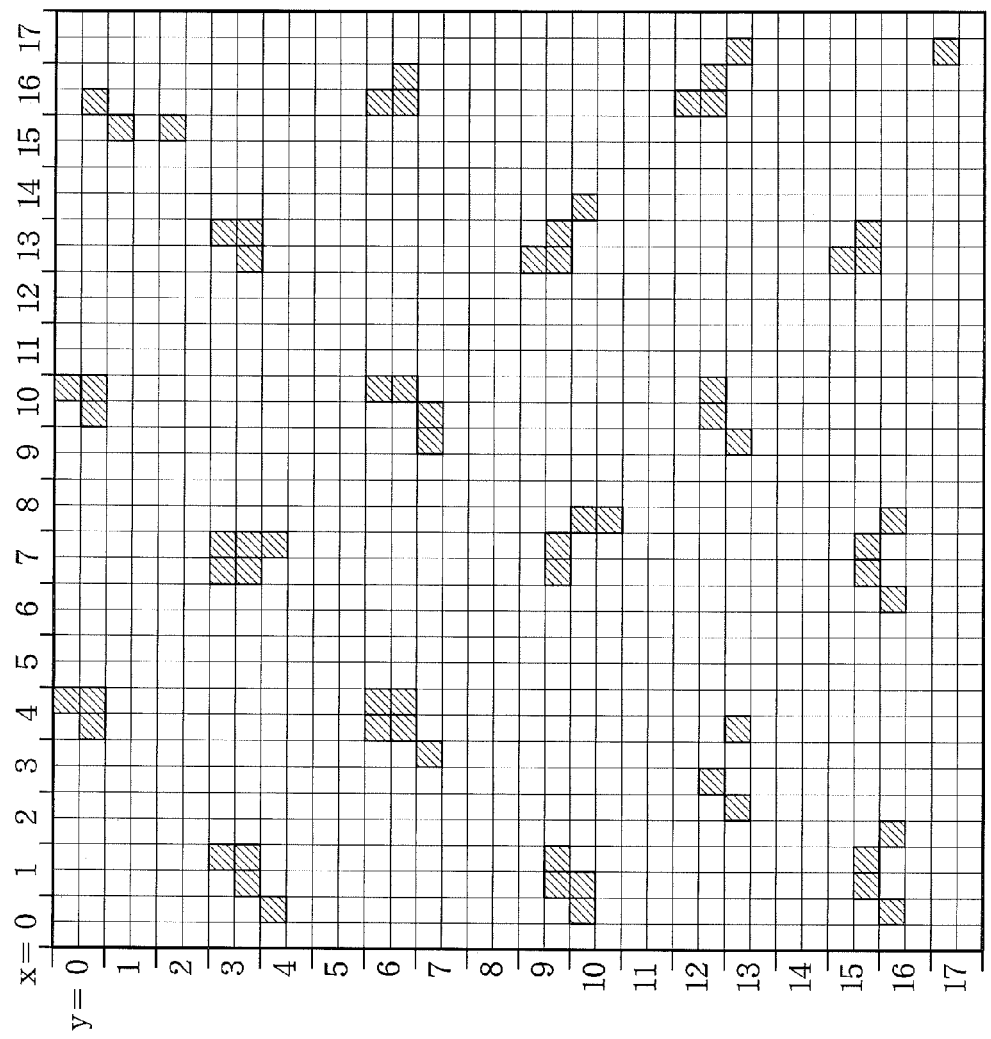
FIG. 34 shows the dot pattern obtained after resolution conversion in the fourth embodiment.

The above processing is iterated until the last pixel in the image data, located at (17, 17) in FIG. 33, has been processed as the pixel of interest. From the processed image data, the resolution converter 320 creates the 2400×2400 dpi dot pattern shown in FIG. 34. The coordinate values in FIG. 34 are the coordinate values before resolution conversion. The output bit pattern has the halftone screen-like structure intended when the offsets used in the concentration modifier 410 were created.

As described above, alteration of the concentration values of the pixels carried out by switching the offset for each pixel position in the concentration modifier 410 enables a bit pattern with a repetitive screen structure to be produced. The screen offsets can be designed to produce an arbitrary screen structure.

As in the first to third embodiments, the pixel clustering level can be adjusted according to the characteristics of the image forming apparatus to reproduce tones closer to the original tones.

Fifth Embodiment

Figure 35:
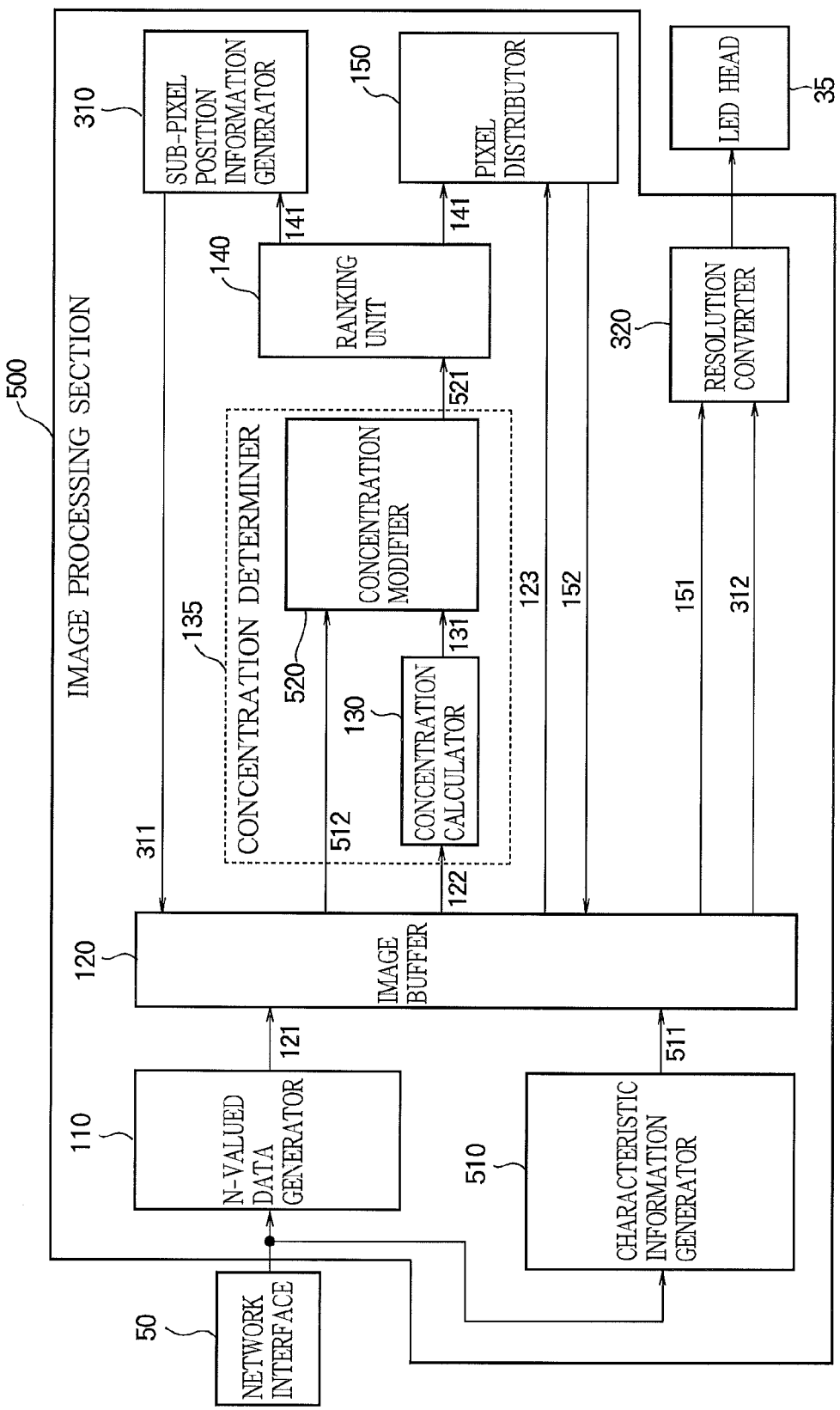
FIG. 35 is a block diagram of the image processing section, network interface, and LED head in a fifth embodiment of the invention.

Referring to FIG. 35, the fifth embodiment is an image forming apparatus that includes the same LED head 35 and network interface 50 as in the first to fourth embodiments, but has a modified image processing section 500. The image processing section 500 differs from the image processing section 400 shown in FIG. 28 in the fourth embodiment in that a characteristic information generator 510 is added and the concentration modifier 410 is replaced with a different concentration modifier 520. The concentration determiner 135 includes the concentration calculator 130 and concentration modifier 520.

The characteristic information generator 510 generates characteristic information indicating a characteristic of the input image at each pixel. The concentration modifier 520 modifies the concentration value 131 (Cn) of the pixel obtained in the concentration calculator 130 according to the characteristic information generated for the pixel by the characteristic information generator 510, and outputs the modified concentration value 521 (Cnb). The characteristic information generated by the characteristic information generator 510 is, for example, information indicating whether the pixel belongs to an edge area in the image. The concentration values are modified in the concentration modifier 520 by the addition of the offsets, for example, but the offsets are switched according to the pixel characteristic.

Figure 36:
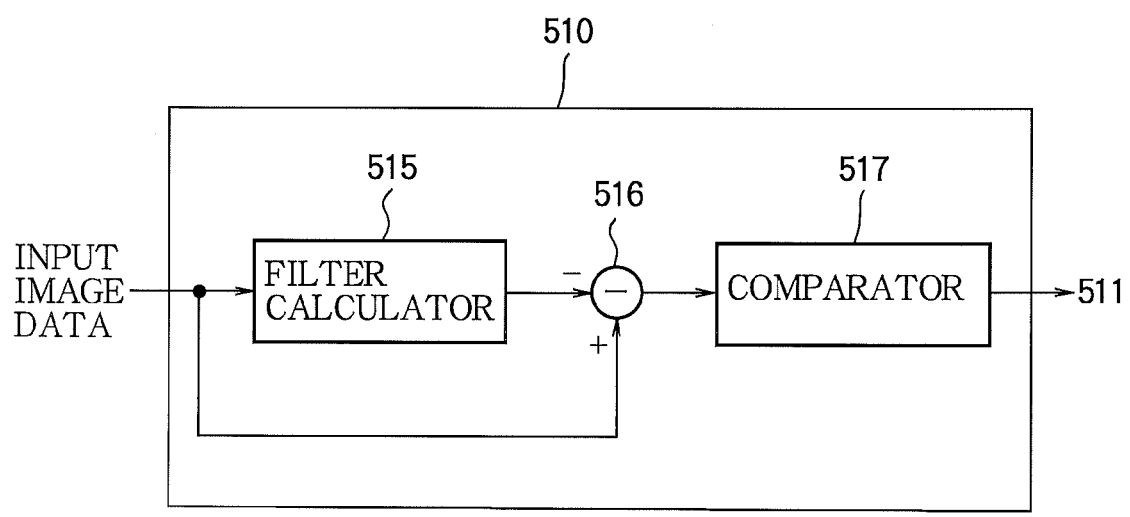
FIG. 36 is an exemplary block diagram of the characteristic information generator in FIG. 35.

FIG. 36 shows an exemplary structure of the characteristic information generator 510, including a filter calculator 515, a subtractor 516, and a comparator 517.

The filter calculator 515 calculates the average pixel value of the pixels in a prescribed range (such as a rectangular range extending a prescribed number of pixels horizontally and a prescribed number of pixels vertically) centered on the pixel of interest. Then the subtractor 516 obtains the difference between the value of the pixel of interest and the average pixel value by subtracting the average pixel value from the pixel value of the pixel of interest. The comparator 517 compares the difference with a preset threshold value, and thereby determines whether the pixel is an edge pixel, i.e., a pixel in an area in which the values of the pixels in the image data vary greatly. If the pixel is located in such an edge area, the comparator 517 outputs characteristic information 511 (Ch) set to '1'; if is not located in an edge area, the characteristic information 511 (Ch) is set to '0'.

The characteristic information generator 510 in this embodiment is not limited to the structure shown in FIG. 36. The characteristic information generator 510 may also test a condition related to the pixel value of the pixel of interest, and take the logical AND of this condition and the edge condition. For example, the characteristic information generator 510 may decide whether a pixel belongs to an edge area and has a pixel value greater than a prescribed threshold value; the purpose of this additional condition is to exclude edges that are not edges of letters of text but instead are edges of other objects in the image.

As shown in FIG. 35, the characteristic information 511 (Ch) is input from the characteristic information generator 510 to the image buffer 120 in addition to the N-valued image data input in the preceding embodiments, and is output from the image buffer 120 to the concentration modifier 520. The characteristic information 512 (Chb) output from the image buffer 120 is the same as the input characteristic information 511 (Ch) but is output in synchronization with the pixel of interest in the five-by-five array of pixels. The concentration modifier 520 also receives the concentration values 131 (Cn).

Figures 37, 38:
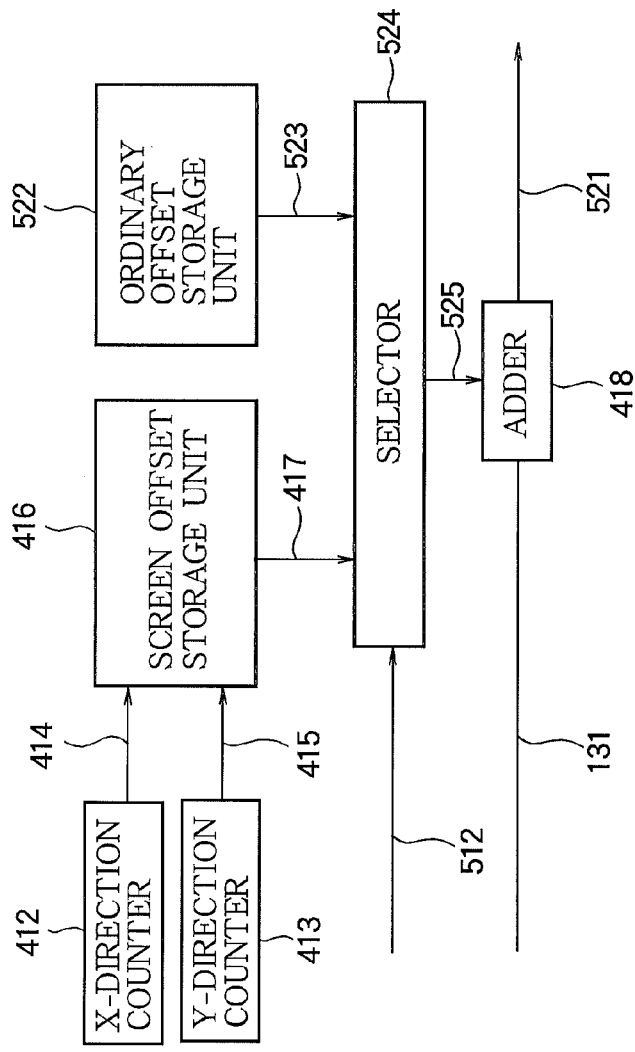
FIG. 37 is an exemplary block diagram of the concentration modifier in FIG. 35.
FIG. 38 illustrates the offset switching operation of the selector in the concentration modifier in FIG. 37.
Figure 42:
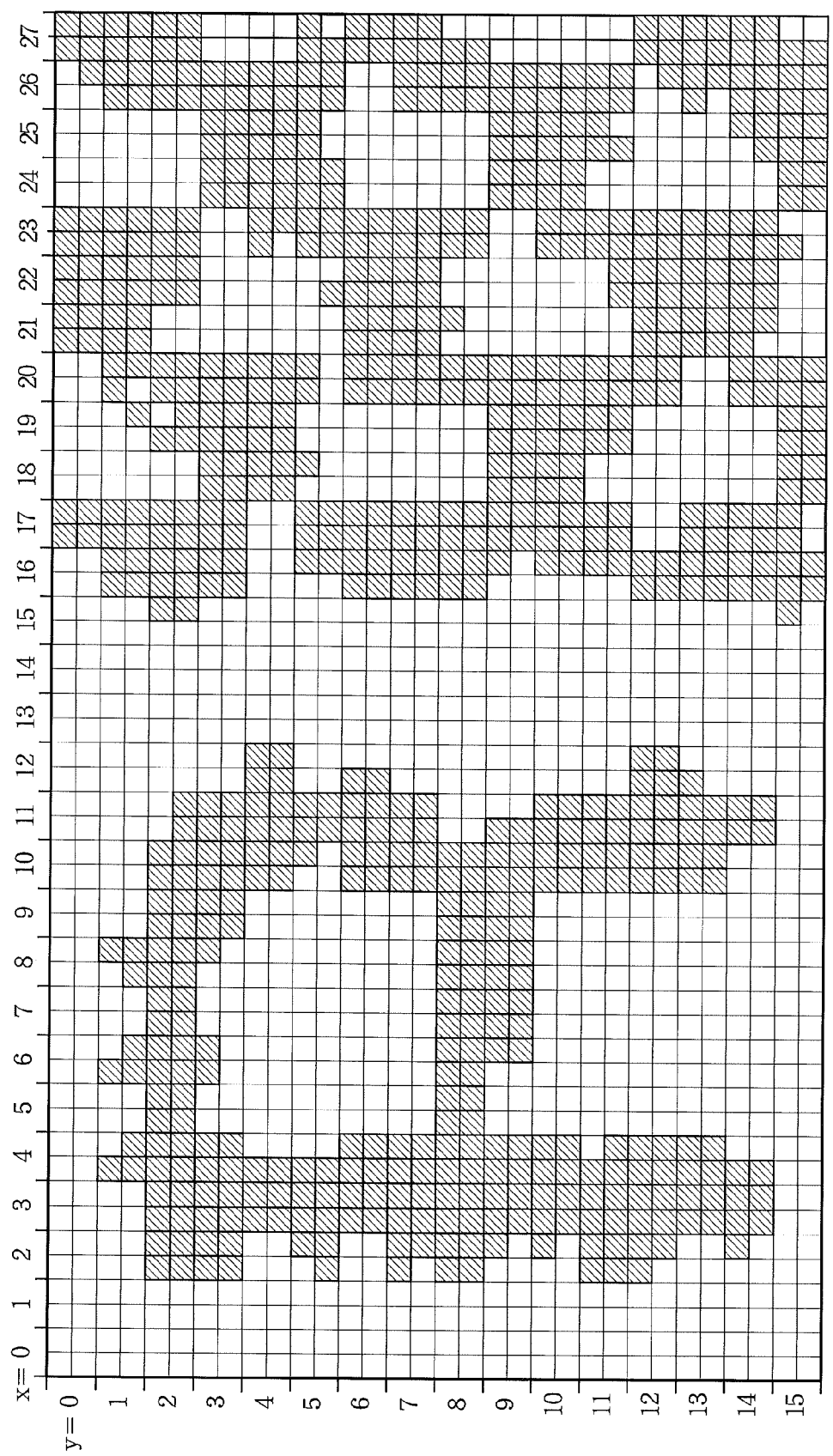
FIG. 42 shows the dot pattern obtained by processing the source image data in FIG. 39 according to the fifth embodiment.

FIG. 37 is a schematic block diagram showing an exemplary structure of the concentration modifier 520 in the fifth embodiment. In addition to the x-direction counter 412, y-direction counter 413, screen offset storage unit 416, and adder 418 described in the fourth embodiment, the concentration modifier 520 includes an ordinary offset storage unit 522 and a selector 524. A selected group of screen offsets 417 (Ofset) stored in the screen offset storage unit 416 and a group of ordinary (non-screen) offsets 523 stored in the ordinary offset storage unit 522 are input to the selector 524. The selector 524 selects one of these two groups of offsets for input to the adder 418.

The ordinary offsets 523 stored in and output from the ordinary offset storage unit 522 may be identical to one of the two groups of offsets used in the second embodiment. In the following description they are identical to the offsets in FIG. 19A, all having offset values of zero.

$$\left\{\begin{array}{lll} Ofst11\_0 = 0, & Ofst12\_0 = 0, & Ofst13\_0 = 0, \\ Ofst21\_0 = 0, & Ofst22\_0 = 0, & Ofst23\_0 = 0, \\ Ofst31\_0 = 0 & Ofst32\_0 = 0, & Ofst33\_0 = 0 \end{array}\right\}$$

The screen offset storage unit 416 stores, for example, the screen offsets shown in FIG. 31. One group of screen offset 417 is selected as described in the fourth embodiment for input to the selector 524.

The selector 524 operates according to the table in FIG. 38. When the characteristic information 512 (Chb) is zero ('0'), indicating that the pixel of interest belongs to a non-edge area, the screen offsets 417 are selected as output offsets 525. When the characteristic information 512 (Chb) is one ('1'), indicating that the pixel of interest belongs to an edge area, the ordinary offsets 523 are selected as the output offsets 525. The adder 418 adds the selected offsets 525 to the concentration values 131 (Cn) obtained by the concentration calculator 130 for the pixel of interest and its eight neighboring pixels, and outputs the resulting modified concentration values 521 (Cnb) to the ranking unit 140.

The other components are the same as in the fourth embodiment, so descriptions will be omitted.

Figure 39:
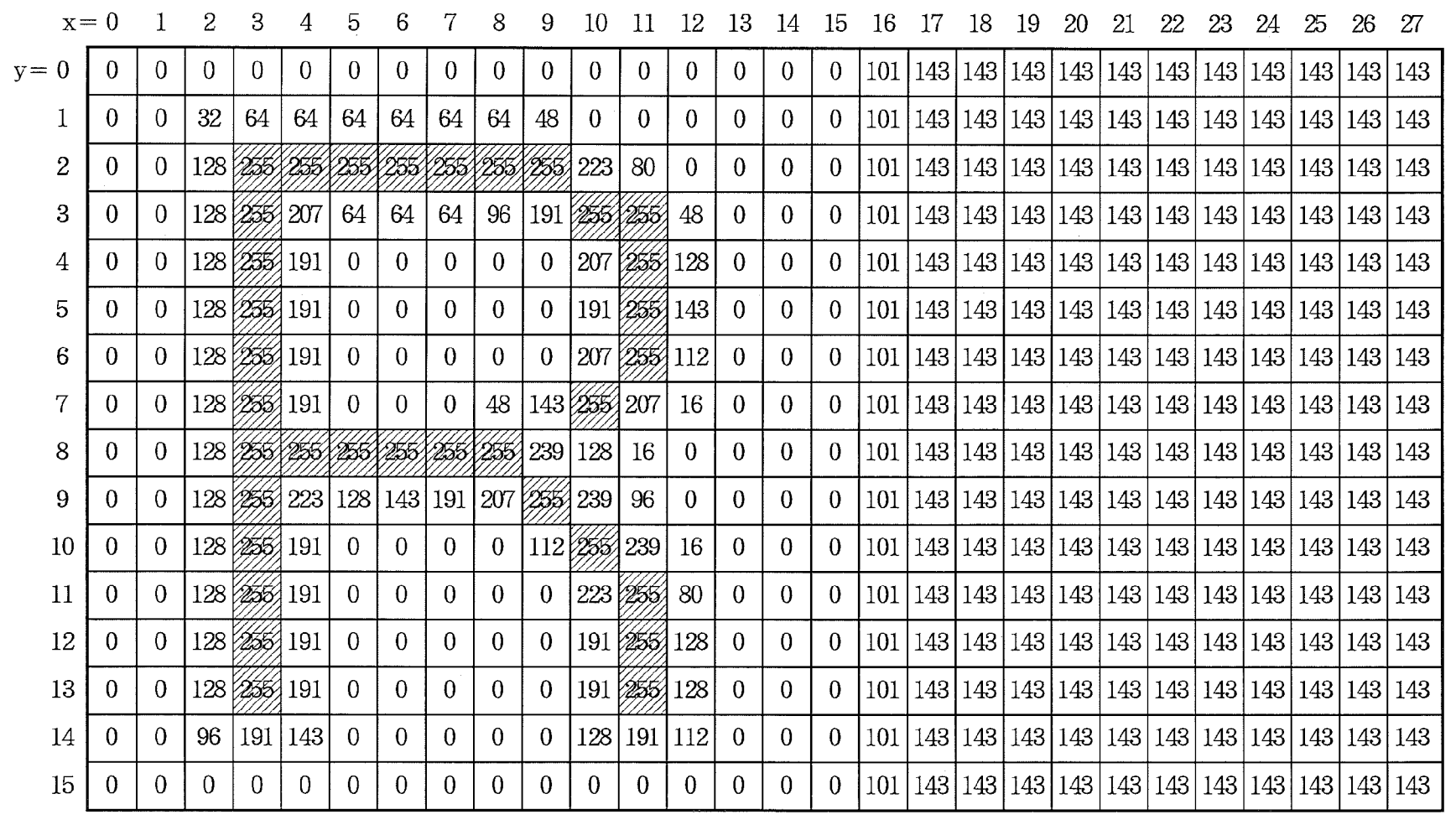
Figure 41:
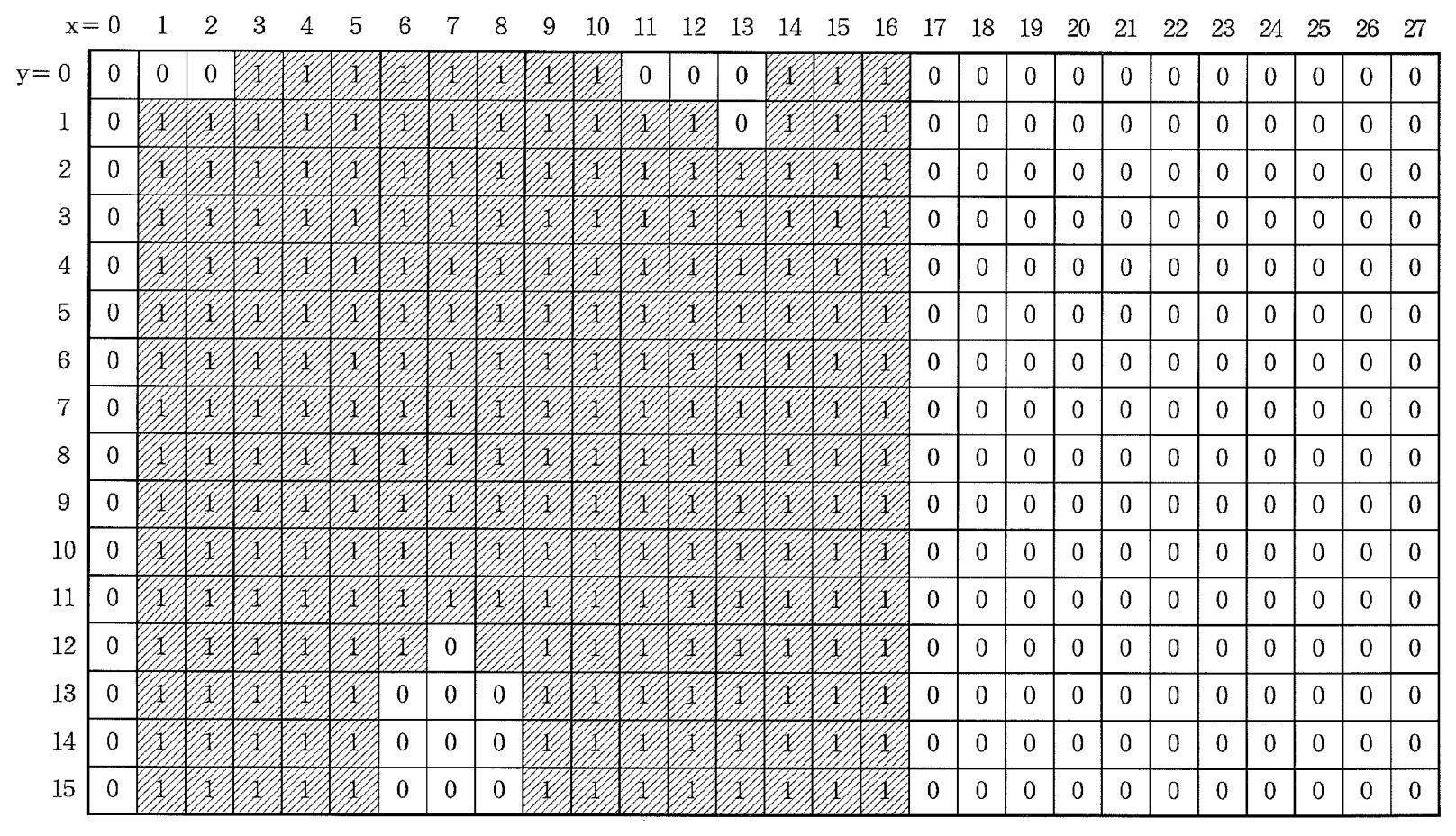

A specific example operation of the concentration calculator 130, ranking unit 140, pixel value distributor 150, sub-pixel position information generator 310, resolution converter 320, and concentration modifier 520 in the fifth embodiment will now be described with reference to FIGS. 39 to 42. The image data shown in FIG. 39 are input to the N-valued data generator 110 and the characteristic information generator 510. The five-valued image data shown in FIG. 40 are output from the N-valued data generator 110 to the image buffer 120. The characteristic information shown in FIG. 41 is generated in the characteristic information generator 510 and output to the image buffer 120.

Referring to FIGS. 39 and 40, the coordinates of the pixel at the top left corner are (0, 0) and the coordinates of the pixel at the bottom right corner are (27, 15). The concentration calculator 130 is assumed to use the weights (filter setting 2) shown in FIG. 13B.

The operation when the pixel of interest is located at pixel position (2, 1) in the image data in FIG. 40 will be described below.

The concentration calculator 130 outputs the following concentration values (Cn) when the pixel of interest is at (2, 1) in FIG. 40.

$$\left\{\begin{array}{lll} Cn11 = 8, & Cn12 = 20, & Cn13 = 24, \\ Cn21 = 24, & Cn22 = 104, & Cn23 = 120, \\ Cn31 = 36, & Cn32 = 156, & Cn33 = 256 \end{array}\right\}$$

The concentration modifier 520 receives characteristic information 512 (Chb) corresponding to the value at the position of the pixel of interest. The value of the characteristic information at position (2, 1) in FIG. 41 is one ('1'), so the selector 524 selects the ordinary offsets 523 as the output offsets 525. The ordinary offsets 523 (all zero) are added to the concentration values calculated in the concentration calculator 130 to obtain modified concentration values (Cnb) as follows.

$$\left\{\begin{array}{lll} Cnb11 = 8, & Cnb12 = 20, & Cnb13 = 24, \\ Cnb21 = 24, & Cnb22 = 104, & Cnb23 = 120, \\ Cnb31 = 36, & Cnb32 = 156, & Cnb33 = 256 \end{array}\right\}$$

The ranking unit 140 receives these modified concentration values 521 from the concentration modifier 520 and outputs the following rank values (Rnk).

$$\left\{\begin{array}{lll} Rnk11 = 8, & Rnk12 = 7, & Rnk13 = 6, \\ Rnk21 = 5, & Rnk22 = 3, & Rnk23 = 2, \\ Rnk31 = 4, & Rnk32 = 1, & Rnk33 = 0 \end{array}\right\}$$

On the basis of these rank values, the pixel value distributor 150 distributes the entire pixel value of the pixel of interest to the pixel at coordinates (2, 1), which is the highest-ranked non-saturated neighboring pixel. The pixel values Dt11 to Dt33 centered on the pixel value Dt22 of the pixel of interest are thereby updated to the following pixel values Dtb11 to Dtb33.

$$\left\{\begin{array}{lll} Dtb11 = 0, & Dtb12 = 0, & Dtb13 = 0, \\ Dtb21 = 0, & Dtb22 = 0, & Dtb23 = 1, \\ Dtb31 = 0, & Dtb32 = 4, & Dtb33 = 4 \end{array}\right\}$$

These data are used to update the pixel values at the following positions in the image data held in the image buffer 120.

$$\left\{\begin{array}{lll} (1, 0), & (2, 0), & (3, 0), \\ (1, 1), & (2, 1), & (3, 1), \\ (1, 2), & (2, 2), & (3, 2) \end{array}\right\}$$

After the completion of the above processing on the current pixel of interest, the processing proceeds to the next pixel of interest, which is the pixel at (3, 1) in the present example. The image buffer 120 supplies the concentration calculator 130 with the pixel values 122 of the five-by-five array of pixels centered on the next pixel of interest, sends the pixel values 123 of the central three-by-three array of pixels to the pixel value distributor 150, and sends the characteristic information 512 (Chb) for the pixel of interest to the concentration modifier 520. Calculation of concentration values, modification of calculation values, calculation of rank values, and distribution of a pixel value are then carried out on the new three-by-three array of pixels.

The sub-pixel position information generator 310 uses the pixel ranks (Rnk) determined by the ranking unit 140 to generate sub-pixel positional information 311. When the pixel of interest is located at (2, 1), the sub-pixel positional information includes starting point information 313 set to '3', growing direction information 314 set to '0', and a diagonal growing flag 315 set to '0'. This sub-pixel positional information 311 is sent to the image buffer 120, where it is held temporarily.

The above processing is iterated until the last pixel in the image data, located at the (27, 15) in FIGS. 39 and 40, has been processed as the pixel of interest. From the processed image data, the resolution converter 320 creates the 2400× 2400 dpi dot pattern shown in FIG. 42. The output bit pattern in the non-edge area on the right in FIG. 42 reflects the screen structure intended when the offsets used in the concentration modifier 520 were created, as described in the fourth embodiment. The output bit pattern in the edge area including the letter 'R' on the left in FIG. 42 does not have a screen structure but maintains clear reproducibility without isolated pixels or isolated small groups of pixels.

As described above, by altering the concentration values by switching the offset for each pixel position according to the characteristic information, the concentration modifier 520 in this embodiment enables clear reproduction of objects such as letters and thin lines characterized by having edges, while enabling non-edge areas, especially solid color areas, to be rendered with a bit pattern having a periodic screen structure. As in the fourth embodiment, an arbitrary screen structure can be selected when the screen offsets are created.

When the input N-valued data already have a screen structure, selective use of the screen offsets and the ordinary offsets can also suppress clustering at letters and thin lines, thereby improving their reproducibility.

In addition, as in the preceding embodiments, the pixel clustering level can be adjusted to suit the rendering characteristics of the image forming apparatus, in order to obtain reproduced tones closer to the original tones.

Variations

Some of the image processing units, such as the ranking unit 140, pixel value distributor 150, resolution converter 160, pixel state calculator 210, concentration modifier 220, sub-pixel position information generator 310, resolution converter 320, concentration modifier 410, and concentration modifier 520, in the preceding embodiments may be implemented in software, or in a programmed computing device. The present invention also includes the image forming methods used in the above image forming apparatuses, programs for implementing these methods in a computing device, and machine-readable recording media in which the programs are recorded.

The above embodiments have been described with reference to an LED printer, but the embodiments are also applicable to laser printers and ink-jet printers, to the print engines of copiers and various multifunction devices, and to display devices such as monitors.

Those skilled in the art will recognize that further variations are possible within the scope of the invention, which is defined in the appended claims.

What is claimed is:

1. An image forming apparatus that converts N-valued input image data representing an N-valued input image, and specifying pixel values of pixels of the N-valued input image, N being an integer equal to or greater than two, into output image data, the image forming apparatus comprising:
   a concentration determiner for taking each pixel as a pixel of interest, and determining a concentration for the pixel of interest by weighted addition of a pixel value of the pixel of interest and pixel values of the neighboring pixels arranged in an area centered on the pixel of interest;
   a ranking unit for assigning a rank to the pixel of interest and to each of the neighboring pixels responsive to the concentrations determined by the concentration determiner; and
   a pixel value distributor for redistributing pixel values among the pixel of interest and the neighboring pixels according to the ranks assigned by the ranking unit.

2. The image forming apparatus of claim 1, wherein the concentration determiner includes a concentration calculator for calculating the concentration of the pixel of interest and the concentration of each of the neighboring pixels.

3. The image forming apparatus of claim 2, wherein the concentration determiner also includes a concentration modifier for modifying the concentrations calculated by the concentration calculator.

4. The image forming apparatus of claim 3, wherein the concentration determiner also includes a pixel state calculator for generating state information concerning the pixel of interest, and the concentration modifier modifies the concentrations calculated by the concentration calculator according to the state information.

5. The image forming apparatus of claim 4, wherein the state information indicates whether or not the pixel of interest and at least some of the neighboring pixels form part of a predetermined pattern.

6. The image forming apparatus of claim 4, wherein the state information concerns the pixel value of the pixel of interest.

7. The image forming apparatus of claim 3, wherein the concentration modifier receives characteristic information concerning the pixel of interest and modifies the concentrations calculated by the concentration calculator according to characteristic information.

8. The image forming apparatus of claim 7, wherein the characteristic information indicates whether the pixel of interest is or is not an edge pixel.

9. The image forming apparatus of claim 3, wherein the concentration modifier modifies the concentrations calculated by the concentration calculator by adding respective offsets to the calculated concentrations.

10. The image forming apparatus of claim 1, wherein the ranking unit assigns the ranks in an order of magnitude of the concentrations determined by the concentration determiner.

11. The image forming apparatus of claim 1, wherein the pixel value distributor distributes the value of the pixel of interest so as to saturate, or nearly saturate, the neighboring pixels in order of their ranks from high to low.

12. The image forming apparatus of claim 1, wherein the pixel value distributor distributes the pixel value of the pixel of interest only to the neighboring pixels ranked higher than the pixel of interest by the ranking unit.

13. The image forming apparatus of claim 1, wherein the output values are values output from a look-up table receiving the pixel values as input values.

14. The image forming apparatus of claim 1, wherein the output values are values obtained by multiplying the pixel values by weighting coefficients.

15. An image forming apparatus that converts N-valued input image data specifying pixel values of pixels, N being an integer equal to or greater than two, into output image data, the image forming apparatus comprising:
   a concentration determiner for determining a concentration for each pixel in a set of pixels that includes a pixel of interest and a plurality of neighboring pixels disposed near the pixel of interest;
   a ranking unit for assigning a rank to the pixel of interest and to each of the neighboring pixels responsive to the concentrations determined by the concentration determiner;
   a pixel value distributor for redistributing pixel values among the pixel of interest and the neighboring pixels according to the ranks assigned by the ranking unit;

a sub-pixel position information generator for generating sub-pixel position information from the ranks assigned by the ranking unit; and a resolution converter for converting the N-valued image data to higher-resolution binary image data by use of the sub-pixel information generated by the sub-pixel position information generator.

16. The image forming apparatus of claim 15, wherein the resolution converter converts the pixel of interest to a matrix of binary sub-pixels by distributing the pixel value of the pixel of interest to the sub-pixels, the sub-pixel position information specifies a starting sub-pixel position located adjacent a neighboring pixel of highest rank, and the resolution converter distributes the pixel value of the pixel of interest preferentially to the sub-pixel in the sub-pixel starting position.

17. An image forming method for converting N-valued input image data representing an N-valued input image, and specifying pixel values of pixels of the N-valued input image, N being an integer equal to or greater than two, into output image data, the image forming method comprising:

taking each pixel as a pixel of interest;

determining a concentration the pixel of interest by weighted addition of a pixel value of the pixel of interest and pixel values of the neighboring pixels arranged in an area centered on the pixel of interest;

assigning a rank to the pixel of interest and to each of the neighboring pixels responsive to the concentrations thus determined; and redistributing pixel values among the pixel of interest and the neighboring pixels according to the assigned ranks.

18. The image forming method of claim 17, wherein determining a concentration includes calculating the concentration of the pixel of interest and the concentration of each of the neighboring pixels.

19. The image forming method of claim 18, wherein determining a concentration also includes modifying the calculated concentrations.

20. The image forming method of claim 17, wherein the ranks are assigned in an order of magnitude of the determined concentrations.

21. The image forming method of claim 17, wherein the pixel value of the pixel of interest is distributed so as to saturate, or nearly saturate, the neighboring pixels in order of their ranks from high to low.

22. The image forming method of claim 17, further comprising:

generating sub-pixel position information from the assigned ranks; and converting the N-valued image data to high-resolution binary image data by use of the sub-pixel information.

23. The image forming method of claim 17, wherein the output values are values output from a look-up table receiving the pixel values as input values.

24. The image forming method of claim 17, wherein the output values are values obtained by multiplying the pixel values by weighting coefficients.

* * * * *